United States Patent
Ikeda

(10) Patent No.: US 11,240,391 B2
(45) Date of Patent: Feb. 1, 2022

(54) IMAGE FORMING APPARATUS FOR DISPLAYING INFORMATION FOR PERFORMING MAINTENANCE ON THE IMAGE FORMING APPARATUS, AND METHOD AND PROGRAM FOR CONTROLLING THE SAME

(71) Applicant: CANON KABUSHIKI KAISHA, Tokyo (JP)

(72) Inventor: Toru Ikeda, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/272,961

(22) Filed: Feb. 11, 2019

(65) Prior Publication Data
US 2019/0174017 A1   Jun. 6, 2019

Related U.S. Application Data

(60) Continuation of application No. 15/482,630, filed on Apr. 7, 2017, now Pat. No. 10,244,133, which is a (Continued)

(30) Foreign Application Priority Data

Oct. 21, 2013   (JP) ................. 2013-218741

(51) Int. Cl.
*H04N 1/00* (2006.01)
*H04N 1/32* (2006.01)
(Continued)

(52) U.S. Cl.
CPC ....... *H04N 1/00506* (2013.01); *G11B 27/007* (2013.01); *G11B 27/105* (2013.01);
(Continued)

(58) Field of Classification Search
None
See application file for complete search history.

(56) References Cited

U.S. PATENT DOCUMENTS

2003/0051077 A1*   3/2003   Fengler .................. G06Q 10/10
                                                         710/8
2007/0002946 A1*   1/2007   Bouton .................. H04N 19/15
                                                         375/240.01
(Continued)

FOREIGN PATENT DOCUMENTS

CN   101060624 A   10/2007
CN   101303546 A   11/2008
(Continued)

OTHER PUBLICATIONS

Mei et al., "Animation Design—Flash Commercial Animation Design Talked About by Web Designers"; vol. 354, pp. 73-76, Jan. 2005.

*Primary Examiner* — Thomas D Lee
(74) *Attorney, Agent, or Firm* — Canon U.S.A., Inc. IP Division

(57) ABSTRACT

An image forming apparatus combines a plurality of sub-movies representing operation procedures to be performed to perform maintenance on the image forming apparatus and plays the combined sub-movies sequentially as one movie. In response to stopping the movie being played, the image forming apparatus displays a replay mark for use to issue a command to replay the movie from the beginning of a sub-movie corresponding to a position where the movie is stopped.

14 Claims, 20 Drawing Sheets

Related U.S. Application Data division of application No. 15/057,996, filed on Mar. 1, 2016, now abandoned, which is a continuation of application No. 14/512,260, filed on Oct. 10, 2014, now Pat. No. 9,307,105.

(51) Int. Cl.
  *G11B 27/10* (2006.01)
  *G11B 27/34* (2006.01)
  *G11B 27/00* (2006.01)

(52) U.S. Cl.
  CPC ......... *G11B 27/34* (2013.01); *H04N 1/00037* (2013.01); *H04N 1/00045* (2013.01); *H04N 1/0049* (2013.01); *H04N 1/00076* (2013.01); *H04N 1/00411* (2013.01); *H04N 1/00488* (2013.01); *H04N 1/3263* (2013.01); *H04N 1/32635* (2013.01); *H04N 1/32657* (2013.01); *H04N 2201/0005* (2013.01); *H04N 2201/0094* (2013.01); *H04N 2201/0098* (2013.01); *H04N 2201/3267* (2013.01); *H04N 2201/3284* (2013.01)

(56) References Cited

U.S. PATENT DOCUMENTS

| | | | |
|---|---|---|---|
| 2007/0201884 A1* | 8/2007 | Yamada | G03G 15/70 399/21 |
| 2007/0237537 A1 | 10/2007 | Hasegawa et al. | |
| 2009/0024927 A1* | 1/2009 | Schrock | H04N 21/4355 715/722 |
| 2011/0210922 A1* | 9/2011 | Griffin | G06F 1/1624 345/173 |
| 2013/0163955 A1* | 6/2013 | Yamamoto | H04N 5/783 386/239 |
| 2013/0191776 A1* | 7/2013 | Harris | H04M 1/72561 715/784 |

FOREIGN PATENT DOCUMENTS

| | | |
|---|---|---|
| JP | 2005-208335 A | 8/2005 |
| JP | 2009-096069 A | 5/2009 |
| JP | 2013-211698 A | 10/2013 |

* cited by examiner

FIG. 4A

| MAINTENANCE ID | MOVIE LIST |
|---|---|
| 001 | A1, A2, A4 |
| 002 | A1, A3, A4 |
| 003 | A1, A2, A3, A4 |
| 004 | B1, B2, B3, B4, B14 |
| 005 | B1, B5, B6, B7, B14 |
| 006 | B1, B8, B9, B10, B14 |
| 007 | B1, B11, B12, B13, B14 |
| | – |

FIG. 4B

| MOVIE ID | MOVIE FILE | PLAY TIME | COVER OPEN/CLOSE FLAG | MESSAGE |
|---|---|---|---|---|
| A1 | /movie/A1.mpeg | 0:10 | 0 | OPEN RIGHT-HAND COVER |
| A2 | /movie/A2.mpeg | 0:30 | 1 | REMOVE PAPER FROM CONVEY PATH |
| A3 | /movie/A3.mpeg | 0:40 | 1 | REMOVE PAPER FROM DUPLEX UNIT |
| A4 | /movie/A4.mpeg | 0:20 | 1 | CLOSE RIGHT-HAND COVER |
| B1 | /movie/B1.mpeg | 0:10 | 0 | OPEN FRONT COVER |
| B2 | /movie/B2.mpeg | 0:20 | 1 | REMOVE EMPTY MAGENTA TONER CARTRIDGE |
| B3 | /movie/B3.mpeg | 0:40 | 1 | PREPARE NEW MAGENTA TONER CARTRIDGE |
| B4 | /movie/B4.mpeg | 0:30 | 1 | INSTALL NEW MAGENTA TONER CARTRIDGE |
| B5 | /movie/B5.mpeg | 0:20 | 1 | REMOVE EMPTY CYAN TONER CARTRIDGE |
| B6 | /movie/B6.mpeg | 0:40 | 1 | PREPARE NEW CYAN TONER CARTRIDGE |
| B7 | /movie/B7.mpeg | 0:30 | 1 | INSTALL NEW CYAN TONER CARTRIDGE |
| B8 | /movie/B8.mpeg | 0:20 | 1 | REMOVE EMPTY YELLOW TONER CARTRIDGE |
| B9 | /movie/B9.mpeg | 0:40 | 1 | PREPARE NEW YELLOW TONER CARTRIDGE |
| B10 | /movie/B10.mpeg | 0:30 | 1 | INSTALL NEW YELLOW TONER CARTRIDGE |
| B11 | /movie/B11.mpeg | 0:20 | 1 | REMOVE EMPTY BACK TONER CARTRIDGE |
| B12 | /movie/B12.mpeg | 0:40 | 1 | PREPARE NEW BLACK TONER CARTRIDGE |
| B13 | /movie/B13.mpeg | 0:30 | 1 | INSTALL NEW BLACK TONER CARTRIDGE |
| B14 | /movie/B14.mpeg | 0:20 | 1 | CLOSE FRONT COVER |

IMAGE FORMING APPARATUS FOR DISPLAYING INFORMATION FOR PERFORMING MAINTENANCE ON THE IMAGE FORMING APPARATUS, AND METHOD AND PROGRAM FOR CONTROLLING THE SAME

CROSS-REFERENCE TO RELATED APPLICATIONS

This application is a Continuation of U.S. patent application Ser. No. 15/482,630, filed Apr. 7, 2017, which is a Division of U.S. patent application Ser. No. 15/057,996, filed Mar. 1, 2016, which is a Continuation of U.S. patent application Ser. No. 14/512,260, filed Oct. 10, 2014, now U.S. Pat. No. 9,307,105, which claims the benefit of Japanese Patent Application No. 2013-218741, filed Oct. 21, 2013, all of which are hereby incorporated by reference herein in their entirety.

BACKGROUND

Field

Aspects of the present invention generally relate to a method of displaying a procedure of performing maintenance on an image forming apparatus.

Description of the Related Art

It has been proposed to configure an image forming apparatus to be capable of playing a movie to present a maintenance procedure as to solving a paper jam, exchanging a toner cartridge, replenishing staples the like (Japanese Patent Laid-Open No. 2008-282217). This technique is intended to make efficient use of high power of expression and a large amount of information provided by a movie thereby making it possible for a user to more easily perform maintenance on the image forming apparatus.

It is common to prepare one movie for each content of procedures of performing maintenance on the image forming apparatus. For example, in a case where the content is as to a solution to a paper jam, a single video is prepared which represents a sequence of operation procedures including an operation of opening a door disposed on a housing of the image forming apparatus to access a location in the image forming apparatus where the paper jam has occurred, an operation of removing the jammed paper, and an operation of closing the door.

When a user performs an operation on the image forming apparatus according to the maintenance procedure presented by the movie, the user is likely to perform the operation while often taking his/her eyes from the movie. For example, when the user performs an operation to remove jammed paper from a paper path, it is difficult to perform the operation while keeping watching the movie, and thus the user is likely to take his/her eyes off the movie during the operation of removing the jammed paper.

However, if the user has a trouble in performing the operation or it takes a rather long time to do something in the operation, the movie may proceeds to a next or further procedure regardless of user's intention, which may result in a difference between the procedure that the user is currently concerned with and the procedure that the movie is currently presenting. Even if the user tries to replay the movie to get information about the procedure that the user is currently concerned with, it may be difficult to determine the position from which to start replaying the movie.

SUMMARY

Aspects of the invention generally provide a technique of handling a situation which may occur when a movie is played to present an operation procedure of performing maintenance on an image forming apparatus.

According to an aspect of the invention, an image forming apparatus includes a playing unit configured to combine a plurality of sub-movies respectively representing operation procedures to be performed to perform maintenance on the image forming apparatus and play the combined sub-movies as a single movie, and a display unit configured to, in response to stopping the movie being played by the playing unit, display a replay mark for use to issue command to replay the movie from the beginning of a sub-movie corresponding to a position where the movie is stopped.

Further features of the present disclosure will become apparent from the following description of exemplary embodiments with reference to the attached drawings.

BRIEF DESCRIPTION OF THE DRAWINGS

FIGS. 4A and 4B are data structure diagrams defining relations between maintenance events and movies according to an embodiment.

DESCRIPTION OF THE EMBODIMENTS

First Embodiment

A first embodiment is described below with reference to drawings.

Figure 1:
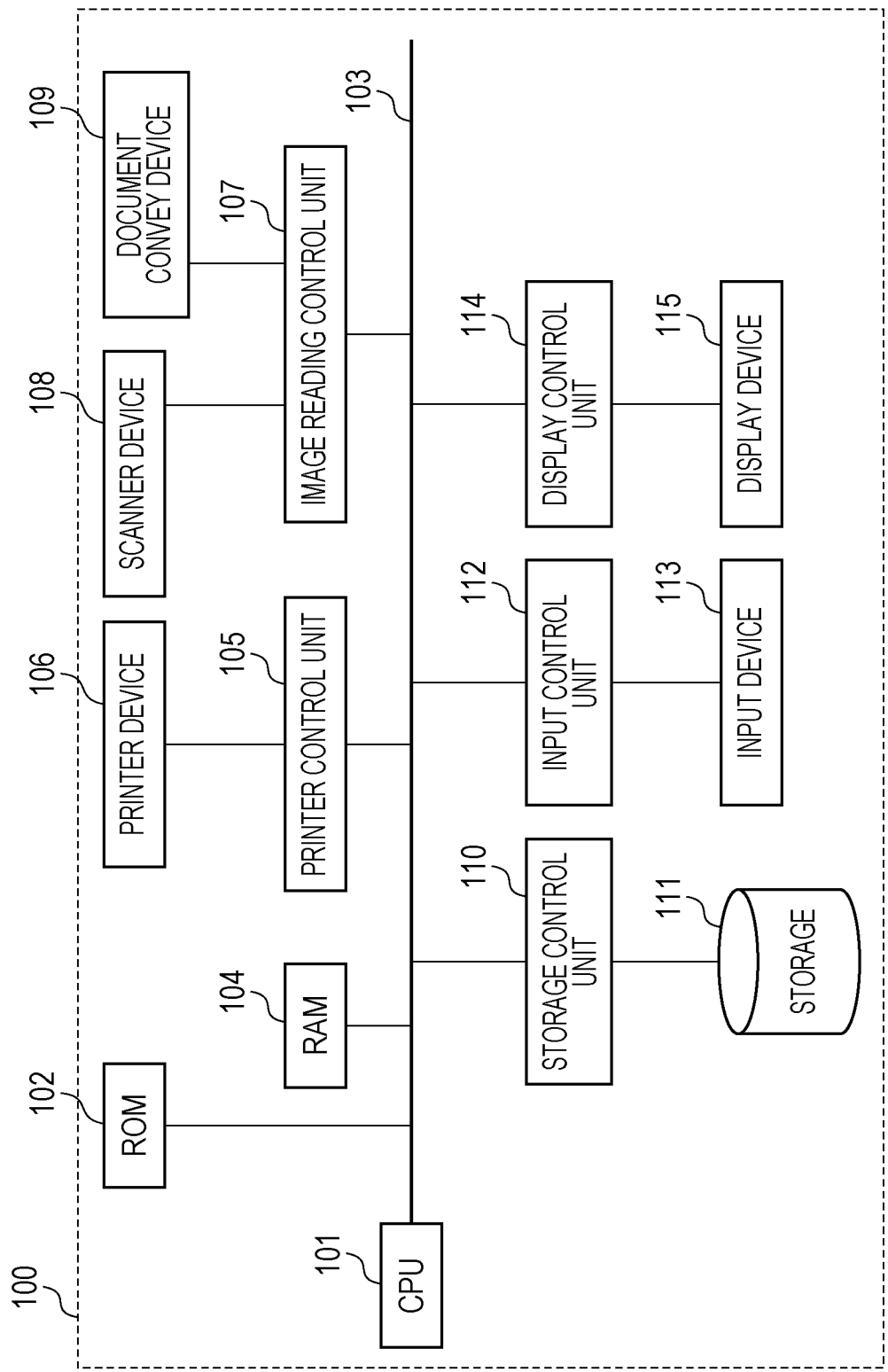
FIG. 1 is a block diagram illustrating a hardware configuration of an image processing apparatus according to an embodiment.

FIG. 1 is a block diagram illustrating a configuration of an image forming apparatus 100, which may be a multifunction printer or the like, according to the first embodiment.

As illustrated in FIG. 1, the image forming apparatus 100 includes a CPU 101, a ROM 102, a RAM 104, a printer control unit 105, an image reading control unit 107, a storage control unit 110, an input control unit 112, and a display control unit 114, which are connected to each other via a bus 103.

The image forming apparatus 100 also includes a storage 111, a printer device 106, a scanner device 108, a document feeding device 109, an input device 113, and a display device 115.

The CPU 101 performs controlling entirely over the image forming apparatus 100. The CPU 101 starts an operating system (OS) using a boot program stored in the ROM 102. On this OS, the CPU 101 executes a program stored in the storage 111. The RAM 104 is used by the CPU 101 as a main memory or a temporary storage area such as a work area. When the CPU 101 executes a program, the CPU 101 reads out the program from the storage 111 and loads it into the RAM 104.

The printer control unit 105 controls the printer device 106 to print image data on a printing sheet such as paper. That is, the printer device 106 is a device configured to print image data on a printing sheet.

The image reading control unit 107 controls the scanner device 108 to generate image data. The image reading control unit 107 also controls the document feeding device 109, which may be an auto document feeder (ADF) or the like, to feed documents one by one from a document plate of the document feeding device 109 to the scanner device 108 to generate image data. The scanner device 108 scans a document using an optical reading device such as a CCD and convers image information on the document into electric signal data.

The storage 111 is a readable and writable nonvolatile storage apparatus such as a HDD. The storage 111 stores a program for controlling the whole image forming apparatus 100, various application programs, and various kinds of data such as movie data for presenting maintenance procedures. The programs are executed by the CPU 101. The storage control unit 110 controls the storage 111.

The input control unit 112 accepts an operation command issued by a user via the input device 113, which may be a touch panel, a hard key, or the like. The display control unit 114 controls the display device 115, which may be a LCD, a CRT, or the like, to present an operation screen, a movie, or the like to a user.

Figure 2:
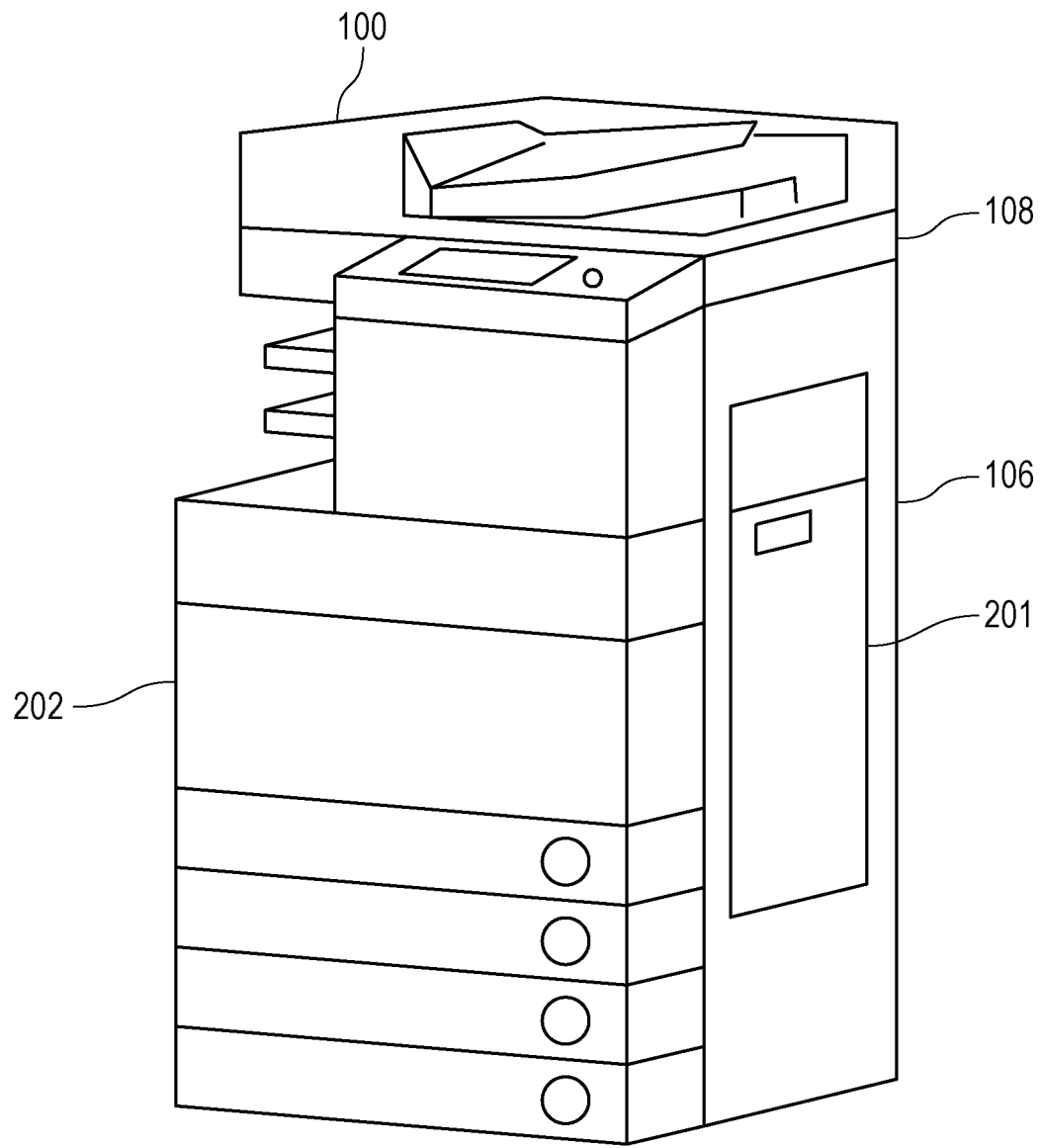
FIG. 2 is a diagram illustrating an external appearance of an image forming apparatus according to an embodiment.

FIG. 2 illustrates an external appearance of the image forming apparatus 100.

The image forming apparatus 100 has a right-hand cover 201 and a toner cover 202 as illustrated in FIG. 2.

The right-hand cover 201 is used to expose a conveying path of printing paper to remove a jammed paper when a paper jam occurs. The toner cover 202 is used to expose a region in which toner containers are disposed when toner is exchanged. The image forming apparatus 100 has sensors for detecting whether the right-hand cover 201 and the toner cover 202 are respectively in open or closed states.

Figure 3:
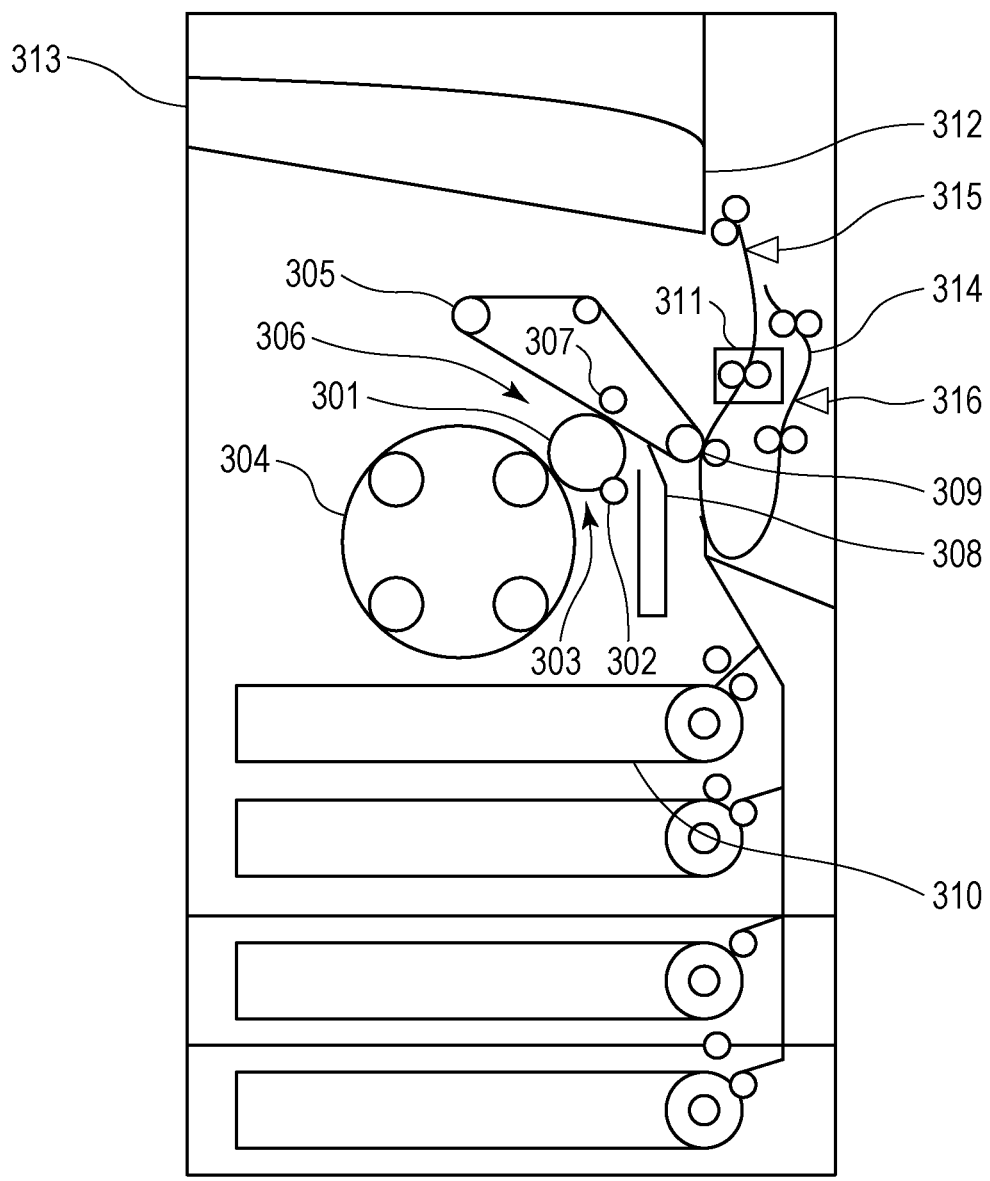
FIG. 3 is a cross-sectional view illustrating an internal structure of an image forming apparatus according to an embodiment.

FIG. 3 is a cross-sectional view illustrating an internal structure of the image forming apparatus 100. Note that the internal structure illustrated in FIG. 3 may be employed, for example, for a CMYK (cyan, magenta, yellow, black) full color image forming apparatus.

A photosensitive drum 301 is charged by a primary charger 302 to a particular electric potential with a particular polarity, and a part thereof denoted by reference numeral 303 is exposed by a not-illustrated exposure unit under the control of the CPU 101. In this manner, an electrostatic latent image corresponding to, for example, K (black) is formed.

A rotary developing unit 304 includes four developing units each integrated with a toner cartridge. After the electrostatic latent image is formed, an image corresponding to K is developed on the photosensitive drum 301 by one of the developing units of the rotary developing unit 304.

An intermediate transfer belt 305 is driven to move in a direction represented by 306 such that the image corresponding to K developed on the photosensitive drum 301 is transferred to the intermediate transfer belt 305 by an electric field formed by a first transfer roller 307 when the intermediate transfer belt 305 comes into contact with the photosensitive drum 301. After the image is transferred to the intermediate transfer belt, the surface of the photosensitive drum 301 is cleaned by a cleaning unit 308. The above process is sequentially repeated such that images of four colors (magenta, cyan, yellow, and black) are superimposed on the intermediate transfer belt and thus a color image is formed as a result. Note that in a case where a single-color image is formed, the transfer process is performed only once.

The image transferred to the intermediate transfer belt 305 is printed, by a second transfer roller 309, on printing paper fed from a cassette 310. The printing paper with the image printed thereon is heated by a fixing unit 311 to fix the image. After the fixing, the paper is conveyed by a roller 312 to a paper discharge opening 313 and is output to the outside of the image forming apparatus. In a case where duplex printing is performed, the paper returned passing through a returning path 314 and the printing process is repeated.

A paper discharge unit sensor 315 and a duplex unit sensor 316 are disposed for detecting whether paper is jammed or not. That is, an occurrence of a paper jam is detected using these sensors. These sensors may be those using a mechanical flag or those using an optical device.

FIG. 4A illustrates a movie list table 400, and FIG. 4B illustrates a movie table 410, both stored in the storage 111 illustrated in FIG. 1.

As illustrated in FIG. 4A, the movie list table 400 defines a relationship between a maintenance event (paper jam, running out of toner, or the like) and a movie to be played when an occurrence of the maintenance event is detected. In the movie list table 400, maintenance IDs 401 and movie lists 402 are described such that each maintenance ID 401 is related to corresponding one of movie lists 402. The maintenance ID is identification information identifying a maintenance event that occurs in the image forming apparatus 100.

In examples of maintenance IDs illustrated in FIG. 4A, maintenance ID 001 indicates a jam in a paper conveying unit which is detected by the paper discharge unit sensor 315. Maintenance ID 002 indicates a jam in a duplex unit which is detected by the duplex unit sensor 316. Maintenance ID 003 indicates a jam in the paper conveying unit and a jam in the duplex unit which are respectively detected by the paper discharge unit sensor 315 and the duplex unit sensor 316.

004 indicates running out of magenta toner, 005 indicates running out of cyan toner, 006 indicates running out of yellow toner, and 007 indicates running out of black toner. These are detected by the printer device 106.

The movie list 402 is a list of movies to be played when corresponding maintenance events occur. When a maintenance event occurs, it is necessary to present a sequence of operation procedures of solving the maintenance event. The sequence of operation procedures includes, for example, a procedure of opening a cover, a procedure of removing jammed paper, a procedure of closing the cover, and the like. In the present embodiment, instead of preparing one movie of a sequence of operation procedures individually for each maintenance event, a movie is prepared for each operation procedure (operation element) and a plurality of movies are combined and played to present a sequence of operation procedures to a user. Hereinafter, each movie corresponding to an operation procedure will be referred to as a sub-movie. In the movie list 402, a combination of a plurality of sub-movies and a playing order thereof are stored in relation to a corresponding maintenance ID 401. For example, when the maintenance ID 401 is 001, the combination of sub-movies is a combination of sub-movies A1, A2, and A4 as defined in a corresponding field in the movie list 402. The playing order is defined by an order in which sub-movies are described in the corresponding field in the movie list 402. For example, in the case where the maintenance ID 401 is 001, sub-movies are to be played in order A1, A2, A4.

As illustrated in FIG. 4B, the movie table 410 is a table defining a correspondence among a movie ID 411, a movie file 412, a play time 413, a cover open/close flag 414, and a message 415.

The movie ID 411 is an ID identifying a sub-movie. Note that the movie ID 411 is also used in the movie list in the movie list table 400 described above. The movie file 412 represents a file name of a sub-movie to be played, and a position of the sub-movie file in the storage 111. Although in the present embodiment, the sub-movie files are stored by way of example in the storage 111, the sub-movie files may instead be stored in an external apparatus such as a server connected to the image forming apparatus via a network, a storage device connected to the image formation apparatus via a USB cable, or the like, and the sub-movie files may be read out therefrom as required.

The play time 413 represents a play time needed to play the sub-movie from the beginning to the end thereof.

A value of the cover open/close flag 414 indicates whether a corresponding sub-movie represents a procedure to be performed before or after the cover of the image forming apparatus 100 is opened. In a case where the cover open/close flag 414 has a value of 0, the corresponding sub-movie represents a procedure to be performed before the cover of the image forming apparatus 100 is opened. On the other hand, in a case where the cover open/close flag 414 has a value of 1, the corresponding sub-movie represents a procedure to be performed after the cover of the image forming apparatus 100 is opened.

The message 415 is a message displayed when a corresponding sub-movie is played.

The respective sub-movie files represent operation procedures described below.

A sub-movie A1 represents an operation procedure of opening a right-hand cover 201. A sub-movie A2 represents an operation procedure of removing paper jammed in a region close to the paper discharge unit sensor 315. A sub-movie A3 represents an operation procedure of removing paper jammed in a region close to the duplex unit sensor 316. A sub-movie A4 represents an operation procedure of closing the right-hand cover 201.

A sub-movie B1 represents an operation procedure of opening the toner cover 202. A sub-movie B2 represents an operation procedure of removing an empty magenta toner cartridge. A sub-movie B3 represents an operation procedure of preparing a new magenta toner cartridge. A sub-movie B3 represents an operation procedure of installing the new magenta toner cartridge.

A sub-movie B5 represents an operation procedure of removing an empty cyan toner cartridge. A sub-movie B6 represents an operation procedure of preparing a new cyan toner cartridge. A sub-movie B7 represents an operation procedure of installing the new cyan toner cartridge.

A sub-movie B8 represents an operation procedure of removing an empty yellow toner cartridge. A sub-movie B9 represents an operation procedure of preparing a new yellow toner cartridge. A sub-movie B10 represents an operation procedure of installing the new yellow toner cartridge.

A sub-movie B11 represents an operation procedure of removing an empty black toner cartridge. A sub-movie B12 represents an operation procedure of preparing a new black toner cartridge. A sub-movie B13 represents an operation procedure of installing the new black toner cartridge.

A sub-movie B14 represents an operation procedure of closing the toner cover 202.

Referring again to FIG. 4A, the movie list 402 is described in further detail below. For example, in a case where a paper jam occurs in the conveying unit (in this case, the maintenance ID is 001), the sub-movie A1 is first played to present the operation procedure of opening the right-hand cover 201. Subsequently, the sub-movie A2 is played to present the operation procedure of removing the jammed paper from the region close to the paper discharge unit sensor 315, and the sub-movie A4 is then played to present the operation procedure of closing the right-hand cover 201. Of the sub-movies displayed, the sub-movie A2 is a sub-movie that represents the operation procedure of resolving the maintenance event, that is, the jam in the paper conveying unit in this example. On the other hand, the sub-movie A1 is a sub-movie representing an operation procedure for make preparations therefor. Hereinafter, the sub-movie representing the operation procedure to be performed before performing the procedure of solving the maintenance event is referred to as a "preparation procedure movie". On the other hand, the operation procedure of solving the maintenance event, that is, the sub-movie representing the operation procedure to be performed after performing the operation procedure represented by the preparation procedure movie is referred to as a "main procedure movie". For example, in a case where the maintenance ID is 001, the sub-movie A1 is used as the preparation procedure movie and the sub-movies A2 and A4 are used as the main procedure movies. In a case where the maintenance ID is 004, the sub-movie B1 is used as the preparation procedure movie and the sub-movies B5, B6, B7, and B14 are used as the main procedure movies. In the present embodiment, sub-movies with a value of 0 for the cover ## open/close flag 414 are preparation procedure movies, and sub-movies with a value of 1 for the cover open/close flag 414 are main procedure movies.

FIGS. 5A to 5D, FIGS. 6A to 6D, FIGS. 7A to 7C, and FIGS. 8A and 8B are diagrams illustrating examples of screens displayed on the display device 115 according to the present embodiment. Referring to these figures, an outline is described below as to how the displayed screen is changed according to the present embodiment.

In FIGS. 5A to 5D, a screen 500 is displayed such that to-be-displayed data thereof is generated by the CPU 101 by executing a program stored in the storage 111, and the resultant to-be-displayed data is displayed on the display device 115 via the display control unit 114 thereby displaying the screen 500.

Figure 5A:
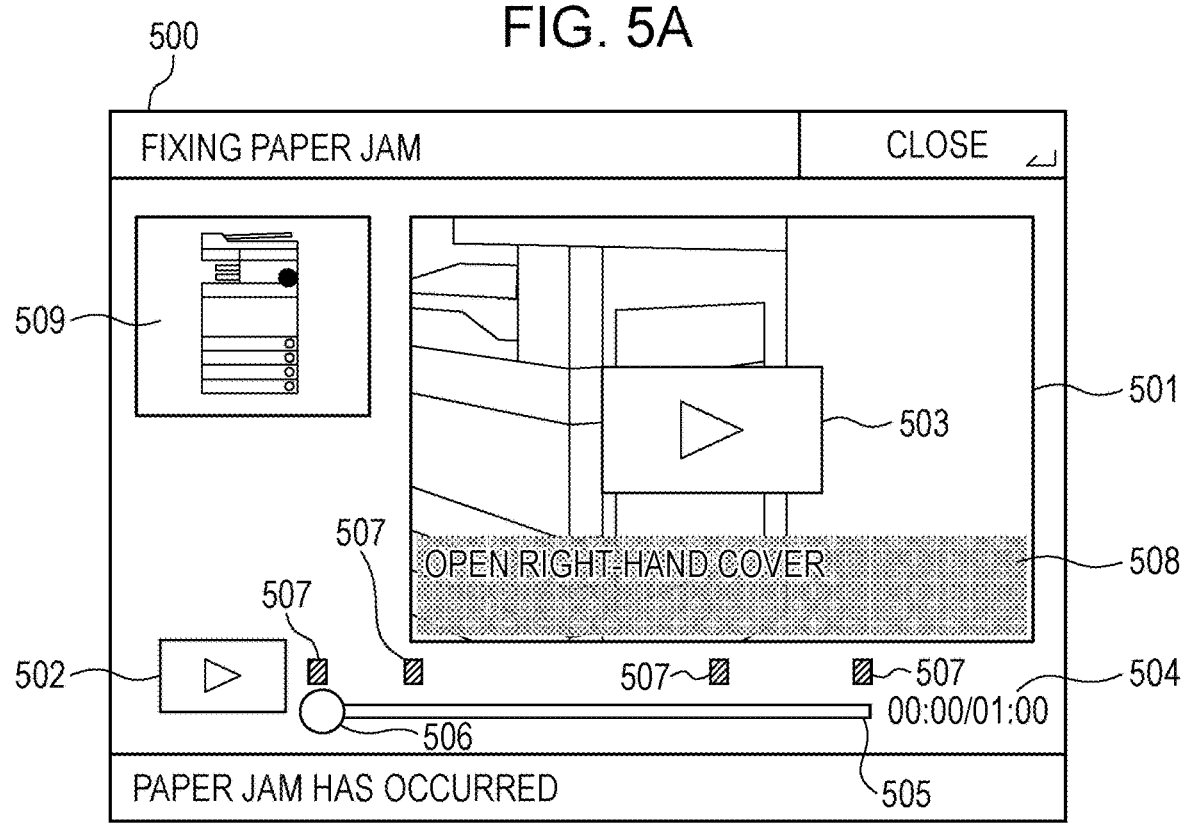
FIGS. 5A to 5D are diagrams illustrating examples of screens of a display device according to an embodiment.

FIG. 5A illustrates an example of a screen that is displayed first when an occurrence of a maintenance event is detected. The following description is given for a case where an occurrence of a jam in the paper conveying unit is detected (in this case, the maintenance ID is 001). In the case where the maintenance ID is 001, then, according to the movie list table 400, sub-movies with movie IDs of A1, A2, and A4 are sequentially played. In the example illustrated in FIG. 5A, the beginning of the sub-movie A1, which is a preparation procedure movie, is displayed in a pause state.

On the screen 500, there are displayed a movie displaying area 501, a play button 502, a play mark 503, a play time indication label 504, a bar 505, a slider 506, a chapter mark 507, a message area 508, and an icon 509.

The movie displaying area 501 is an area for displaying a movie to present a maintenance procedure. The play button 502 is a button used to issue a command to start playing a movie. The play mark 503 is a mark used to issue a command to play a movie, as with the play button 502. When the play button 502 or the play mark 503 is pressed (touched), the CPU 101 starts playing the movie.

The play time indication label 504 indicates the total sum of play times of a plurality of sub-movies to be played (hereinafter referred to as the total playing time) and indicates the current playing position in the total playing time.

A combination of the bar 505 and the slider 506 forms a seek bar that indicates a playing position in the total playing time and that allows a user to change the playing position to a particular position. The bar 505 graphically indicates the total playing time. The slider 506 indicates the current playing position and is used to specify a particular position to which the playing position is to be moved. As the movie proceeds, the slider 506 moves correspondingly within a range of the bar 505. By dragging (moving) the slider 506, it is allowed to move the playing position to a desired position from the current position. When an arbitrary position on the bar 505 is pressed, the playing of the movie is advanced to the pressed position, and the slider 506 is correspondingly moved to the pressed position. The chapter mark 507 indicates a boundary between chapters.

The play time indication label 504 and the chapter mark 507 are described below with reference to specific examples. In a case where the maintenance ID is 001, then, according to the movie list table 400, sub-movies A1, A2, and A4 are sequentially played. The movie table 410 indicates that the play times of these sub-movies are respectively 10 seconds (00:10), 30 seconds (00:30), and 20 seconds (00:20). The total playing time is given by the total sum of play times of sub-movies to be played, and thus in this specific example the total playing time is 1 min 00 sec (01:00). On the other hand, the play time represents the current playing position in the total playing time. For example, in a case where a scene is being displayed that is located 5 seconds (00:05) elapsed from the beginning of the sub-movie A1, which is a sub-movie displayed first, the play time is 5 seconds. On the other hand, in a case where the current scene is at a position where 10 seconds has elapsed from the beginning of the sub-movie A2, which is a second sub-movie in the present combination of sub-movies, the play time is given by the sum of the play time of 10 seconds for the sub-movie A1, whose playing is completed, and the time of 10 seconds which has been spent in playing the sub-movie A1, and thus the play time is 20 seconds (00:20). The play time indication label 504 indicates the play time and the total playing time calculated in the above-described manner in a form in which character strings representing them are separated by a slash (/).

A chapter mark 507 is displayed at a boundary between operation procedures in the sequence of operation procedures. In the present example, two chapter marks 507 are displayed at boundaries at which sub-movies is changed, and more particularly such that one is displayed at a boundary between A1 and A2 and the other is displayed at a boundary between A2 and A4. In addition, two chapter marks 507 may be displayed such that one is at the beginning of the total movie and the other is at the end of the total movie. In the example illustrated in FIG. 5A, chapter marks 507 are displayed at the four positions described above.

In the message area 508, a message is displayed to provide supplementary information in addition to the content of the sub-movie being played. More specifically, for example, when the sub-movie A1 is played, a message "Open right-hand cover" is displayed according to data in a corresponding field of the message 415 of in the movie table 410. The message area 508 may be hidden when a predetermined time has elapsed since the playing of the corresponding sub-movie is started, or the message area 508 may be displayed as long as the corresponding sub-movie is being played.

The icon 509 indicates a part of the image forming apparatus 100 in which a maintenance event occurs. More specifically, for example, in a case where the maintenance ID is 001 indicating that paper jam has occurred in the paper conveying unit, the icon 509 indicates the paper conveying unit.

Figure 5B:
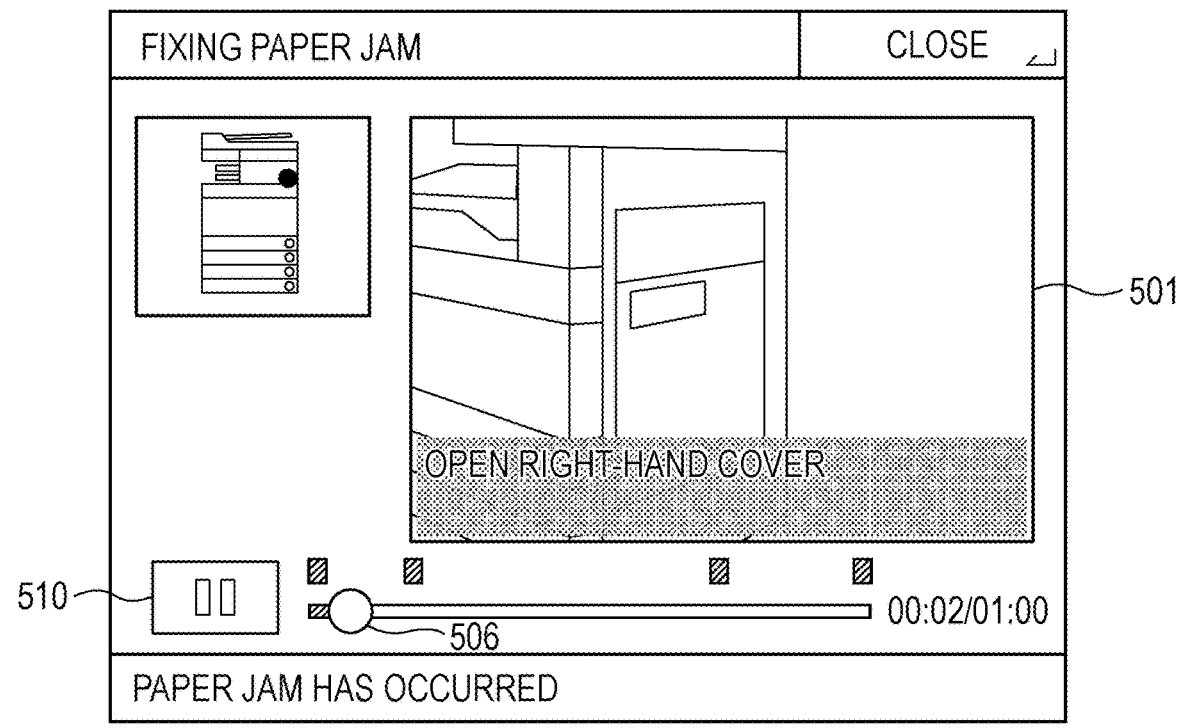

On the screen illustrated in FIG. 5A, when the play button 502 or the play mark 503 is pressed, playing of a movie is started. In the case where the maintenance ID is 001, the CPU 101 starts playing the sub-movie A1, which is a preparation procedure movie. FIG. 5B illustrates an example of a screen at a displaying position of the sub-movie A1 2 seconds after the beginning of the sub-movie A1. In response to starting playing the movie, the play button 502 and the play mark 503 are hidden, and, instead, the pause button 510 is displayed at the same location where the play button 502 was displayed.

Figure 5C:
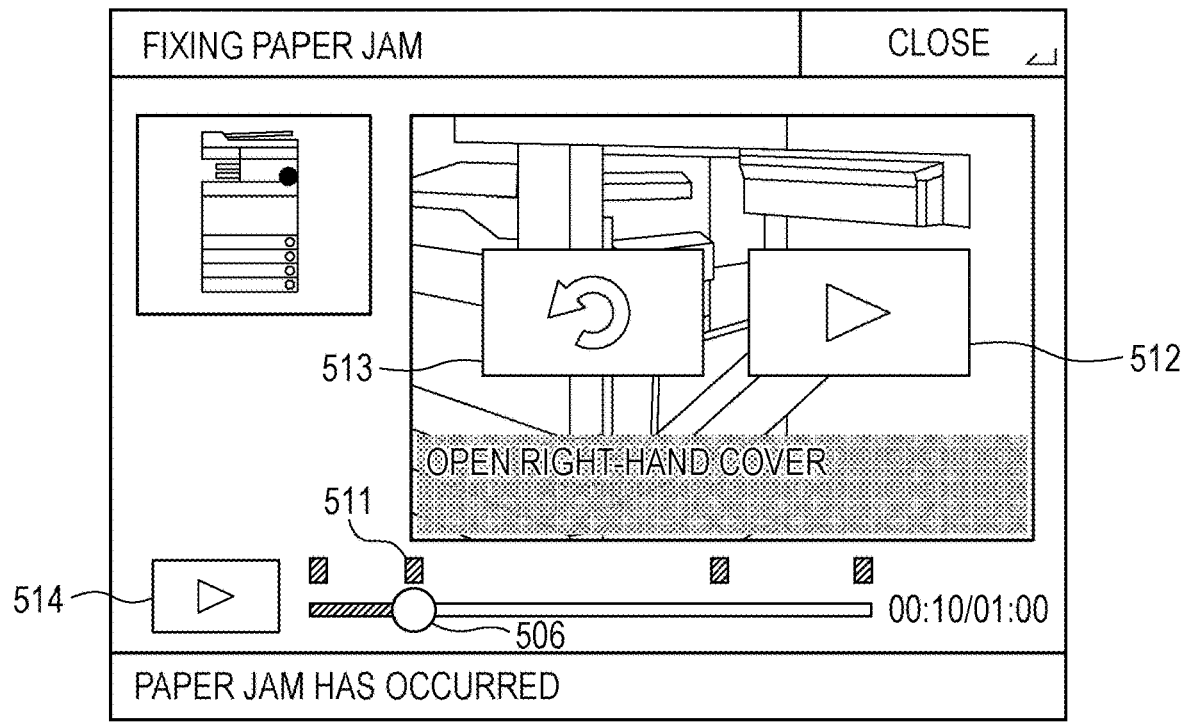

FIG. 5C illustrates an example of a screen in a state in which the playing position has reached the end of the sub-movie A1. At a point of time when the playing of the sub-movie A1 is ended, that is, at the position of the chapter 511, the playing of the movie is automatically stopped and held in a pause state, and the play mark 512 and the replay mark 513 are displayed. The pause button 510 is hidden, and, instead, the play button 514 is displayed at the place where the pause button 510 was previously displayed. The replay mark 513 is a mark used to issue a command to replay the sub-movie being currently in the pause state from the beginning of the sub-movie. More specifically when the movie is in the pause state at the position of the chapter mark 511, if the replay mark 513 is pressed, the CPU 101 moves the playing position of the sub-movie A1 to the beginning thereof and restarts playing the sub-movie A1. By controlling the playing of the movie such that when the playing position reaches the end of a sub-movie, the playing is automatically stopped and held in the pause state as described above, it is possible to prevent the movie from proceeding to a next operation procedure without taking into account the user's intention. Furthermore, when the operation comes into the pause state, the replay mark 513 is displayed together with the play mark 512, it becomes easy for a user to select whether to proceed to a movie of a next operation procedure or replay the same movie.

FIG. 15D illustrates an example of a screen displayed when opening of the right-hand cover 201 is detected in the middle of the process of playing the sub-movie A1. When opening of the right-hand cover 201 is detected, the CPU 101 automatically ends the playing of the sub-movie A1 and displays the sub-movie A2, which is a first sub-movie of the main procedure movies, in such a manner that the playing is stopped at the beginning (chapter mark 515) of the sub-movie A2. In this case, of various marks, only the play mark 516 is displayed. By displaying only the play mark 516, it becomes possible to prompt a user to watch the movie to know what to do next in the operation procedure. In the message area 508, a message "Remove the paper from the paper conveying unit" corresponding to the sub-movie A2 is displayed. In the case where the right-hand cover 201 is already opened, it is not necessary to play the sub-movie A1, and thus the replay mark is not displayed. In a case where the operation instructed by the preparation procedure movie is completed, the playing of the movie automatically proceeds to a main procedure movie, which ensures that an instruction of a next procedure is presented to a user.

Figure 5D:
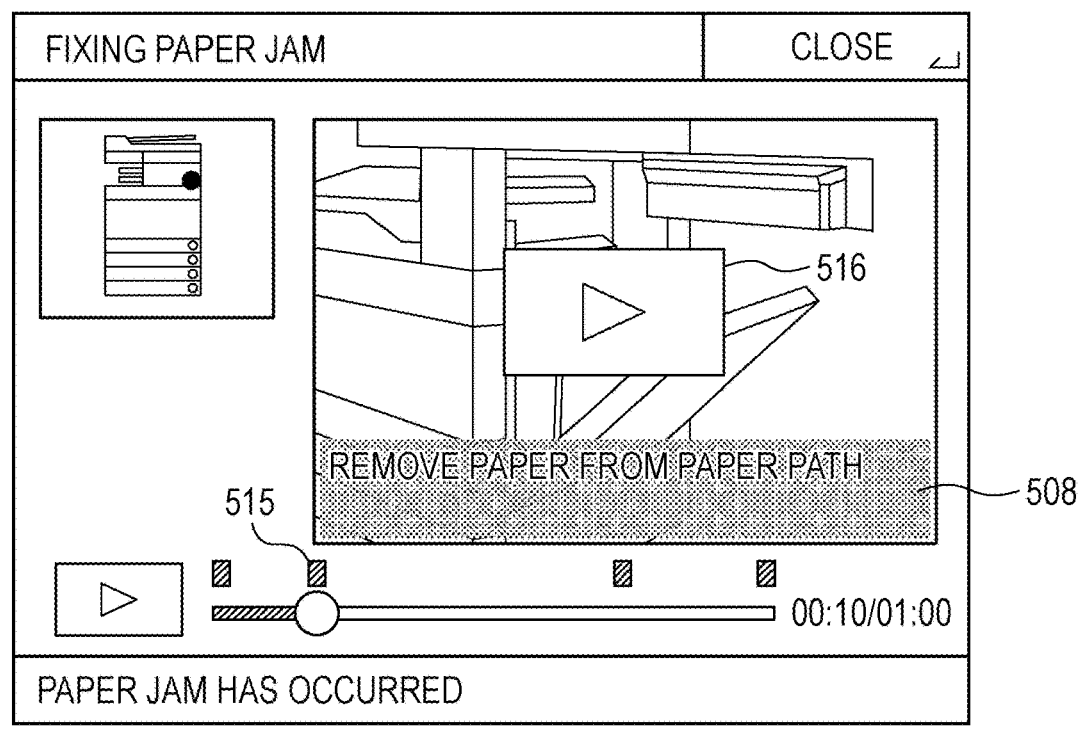

As may be seen from a comparison between FIG. 5C and FIG. 5D, the movie is in the pause state at the same chapter position (511, 515) but there is a difference in whether the replay mark is displayed or not. As described above, even in the case where the movie is in the pause state at the boundary between the preparation procedure movie and the main procedure movie, a user is allowed to easily get to know whether the operation instructed by the preparation procedure movie is completed, by checking whether the replay mark is displayed or not.

Figure 6A:
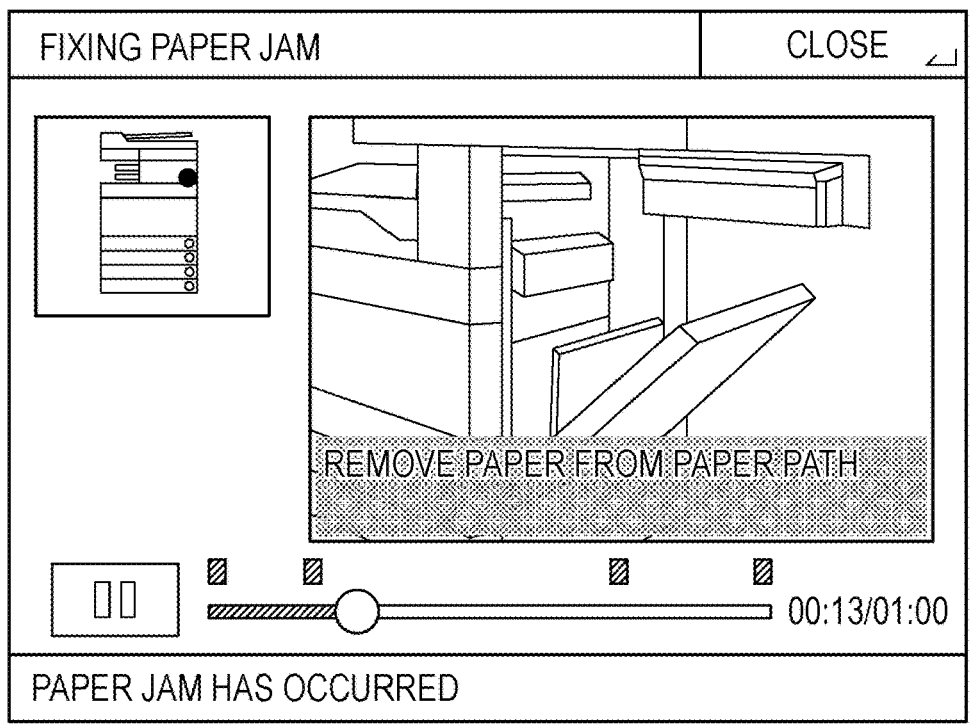
FIGS. 6A to 6D are diagrams illustrating examples of screens of a display device according to an embodiment.

In the screen illustrated in FIG. 5C or in that illustrated in FIG. 5D, when the play mark 512 or 516 or the play button 514 is pressed, playing of the sub-movie A2 is started. FIG. 6A illustrates an example of a screen of the sub-movie A1 displayed when 3 seconds have elapsed since the playing of the sub-movie A2 is started.

Figure 6B:
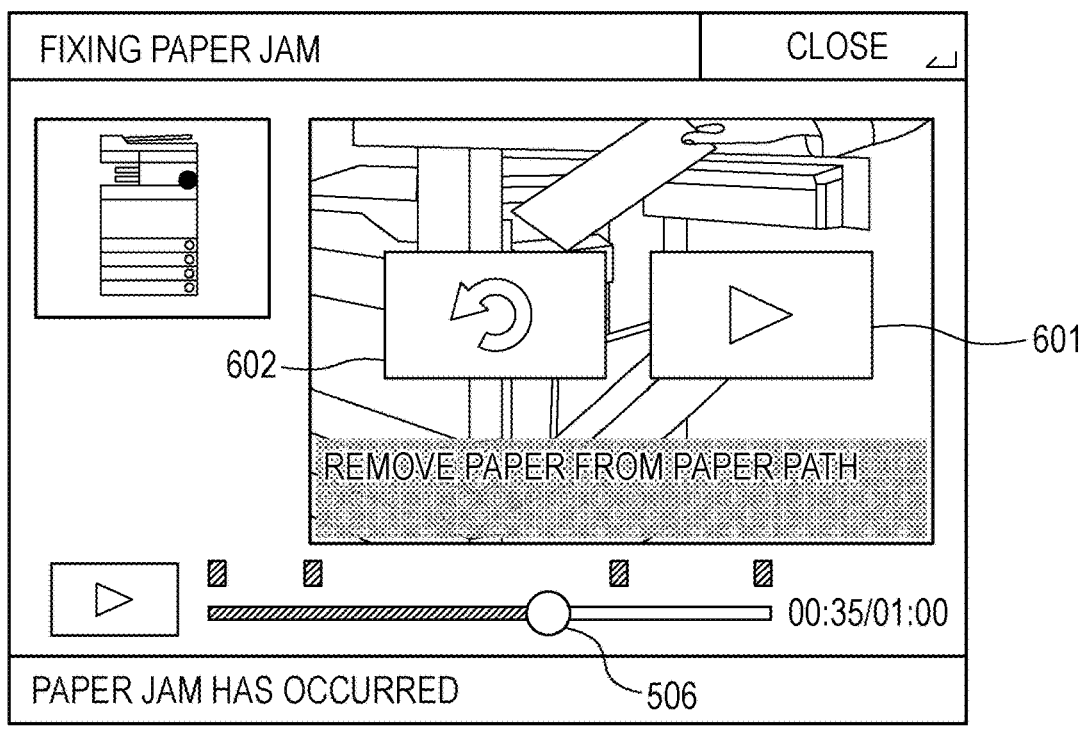

FIG. 6B illustrates an example of a screen displayed when the pause button or the movie displaying area is pressed in the middle of the operation of playing the sub-movie A2. When the pause button or the movie displaying area is pressed, the playing of the movie is stopped, and the replay mark 602 is displayed together with the play mark 601.

Figure 6C:
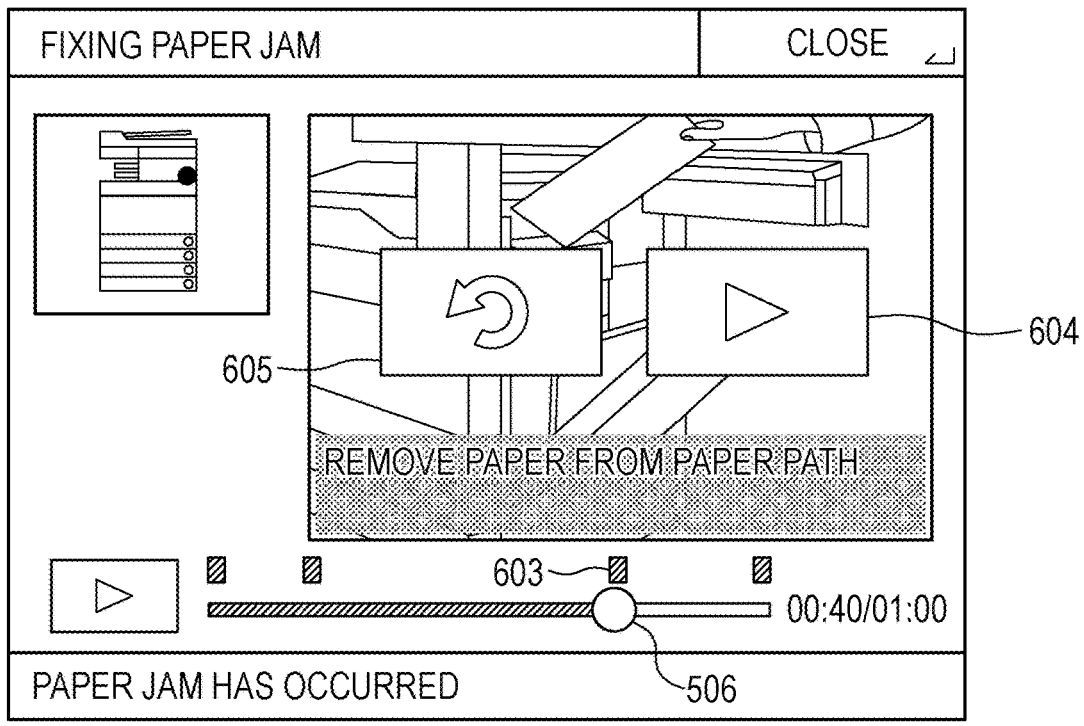

FIG. 6C illustrates an example of a screen displayed in a state in which the playing operation has reached the end of the sub-movie A2. At a point of time when the playing of the sub-movie A2 is ended, that is, at a position of a chapter 603, the playing of the movie is automatically stopped and held in a pause state, and a replay mark 605 is displayed together with a play mark 604.

Figure 6D:
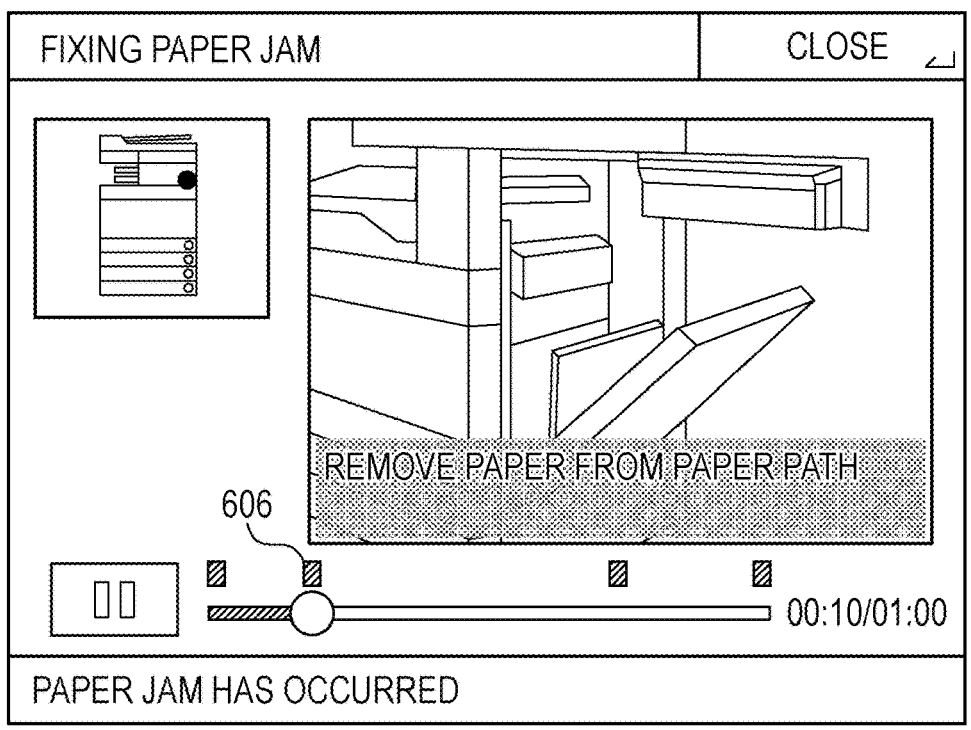

FIG. 6D illustrates an example of a screen displayed when the replay mark 602 in the screen displayed in FIG. 6B or the replay mark 605 in the screen displayed in FIG. 6C is pressed. When the replay mark 602 or 605 is pressed, the position is moved to the beginning (chapter 606) of the sub-movie A2 being currently in the pause state and the playing is restarted from the beginning of the sub-movie A2.

As described above, also in the case where the playing of the movie is stopped temporarily in response to an intentional operation performed by a user, the replay mark is displayed together with the play mark as with the case in which playing of a movie is automatically stopped temporarily when playing of a sub-movie is completed.

Figure 7A:
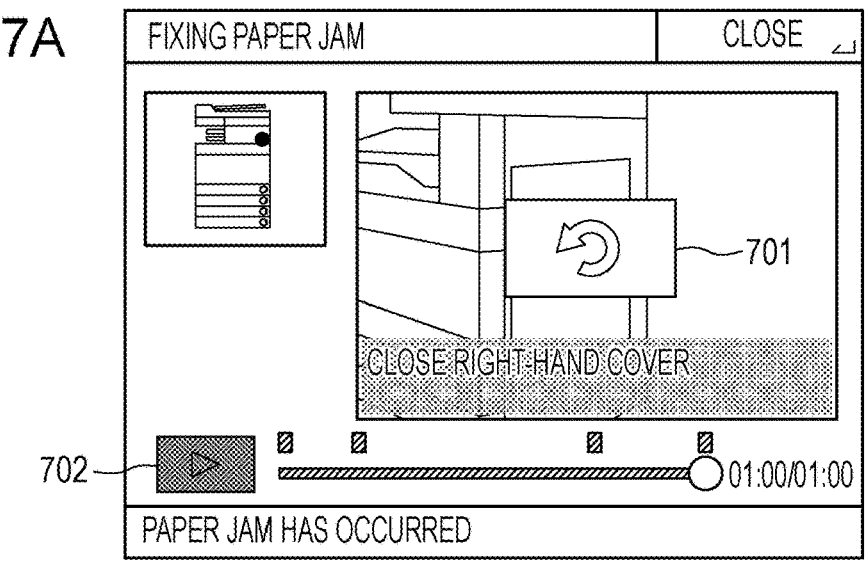
FIGS. 7A to 7C are diagrams illustrating examples of screens of a display device according to an embodiment.

FIG. 7A illustrates an example of a screen displayed in a state in which the playing position has reached the end of the total movie (the end of the sub-movie A4 in the case where the maintenance ID is 001). In this case, there is no sub-movie to be displayed next, and thus only the replay mark 701 is displayed and the play mark is not displayed. The play button 702 is grayed out to indicate that the play button 702 is disabled.

Figure 7B:
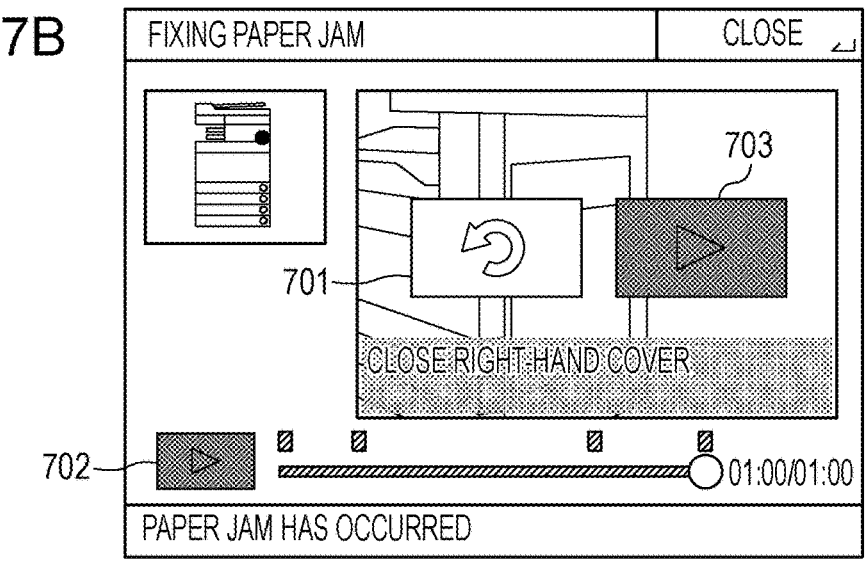

FIG. 7B illustrates another example of a screen displayed in a state in which the playing position has reached an end of a movie. Unlike the example illustrated in FIG. 7A, a play mark 703 is displayed together with the replay mark 701, but the play mark 703 is grayed out to indicate that the play mark 703 is disabled. Even if the grayed-out play button 702 or play mark 703 is pressed, the pressing is ignored.

As described above, when the playing is completed for the whole of the plurality of sub-movies corresponding to the maintenance event that has occurred, the screen displayed in this state is different from that displayed when the playing is stopped temporarily in the middle of the playing operation, and this difference makes it possible for a user to recognize that the playing of the whole movie is completed.

Figure 7C:
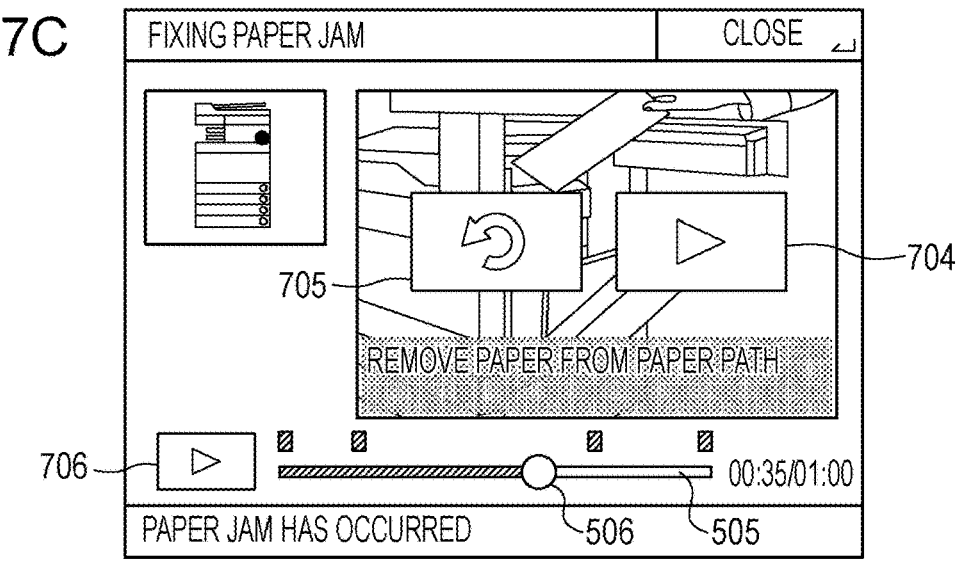

FIG. 7C illustrates an example of a screen displayed when the slider 506 is moved in the state illustrated in FIG. 7A or 7B. In this case, a play mark 704 is displayed together with a replay mark 705. Furthermore, the gray-out mode for the play button 706 is released. As described above, even in the state in which playing of a movie is completed until the end of the movie, it is allowed to replay the movie from an arbitrary position specified by moving the slider 506 or pressing the bar 505.

Figure 8A:
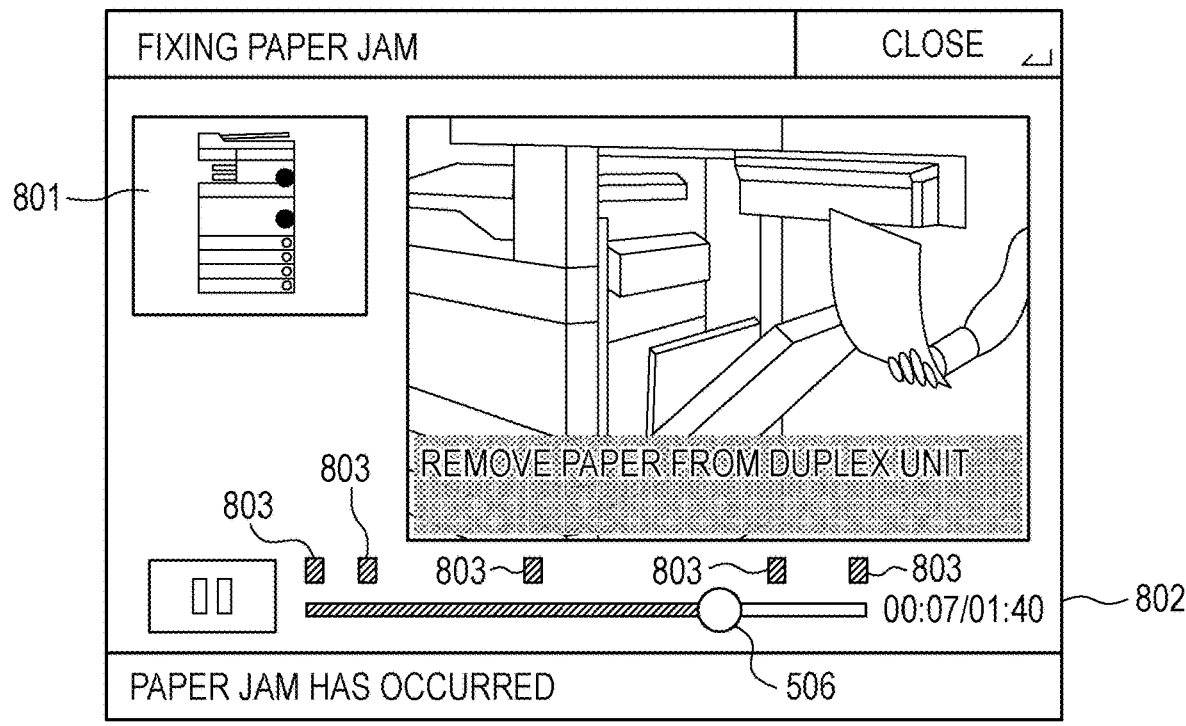
FIGS. 8A and 8B are diagrams illustrating examples of screens of a display device according to an embodiment.

FIG. 8A illustrates an example of a screen displayed in a situation in which jams in the paper conveying unit and in the duplex unit are detected (in this case, the maintenance ID is 003) and a corresponding movie is being played.

An icon 801 indicates that paper jams have occurred in the paper conveying unit and also in the duplex unit. In the case where the maintenance ID is 303, then, according to the movie list table 400, sub-movies with movie IDs of A1, A2, A3, and A4 are sequentially played. Thus, the play time indication label 802 indicates that the total playing time given by the total sum of play times of these sub-movies is 1 minutes 40 seconds (01:40) and also indicates the current playing position. Chapter marks 803 are displayed at following respective positions: the beginning of the movie; the end of the movie; and boundaries between adjacent sub-movies. In the example illustrated in FIG. 8A, the playing is completed for the sub-movie A2 representing the procedure of removing the paper jammed in a region close to the paper discharge unit sensor 315, and playing of the sub-movie A3 is in progress to present the procedure of removing jammed paper from a region close to the duplex unit sensor 316. Herein it is assumed by way of example that a user has completed the process of removing the jammed paper from the region close to the paper discharge unit sensor 315 according to the procedure presented by the sub-movie A2.

Figure 8B:
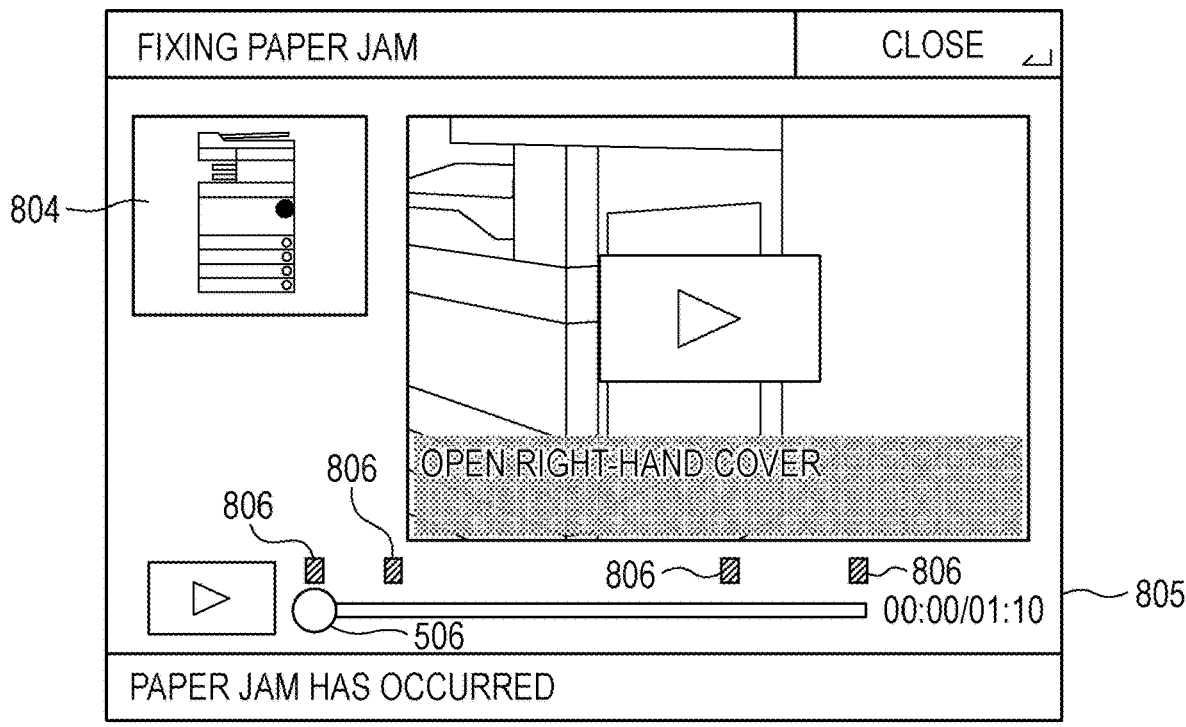

FIG. 8B illustrates an example of a screen displayed when closing of the right-hand cover 201 is detected in the state in which the screen illustrated in FIG. 8A is displayed. In this situation, the paper jam in the duplex unit is not yet solved although the paper jam in the paper conveying unit has been solved, and thus the CPU 101 updates the maintenance ID and switches the operation to play the movie corresponding to the jam in duplex unit (in this case, the maintenance ID is 002). More specifically, in the case where the maintenance ID is 002, then, according to the movie list table 400, sub-movies with movie IDs of A1, A3, and A4 are sequentially played. That is, the CPU 101 displays a screen in which the beginning of the sub-movie A1 is displayed in a pause state. Furthermore, the displaying is updated for the icon 804, the play time indication label 805, and the chapter mark marks 806.

As descried above, at a time when closing of the cover is detected, checking is performed again as to the maintenance event occurring in the image forming apparatus 100, and the movie to be further displayed is changed as necessary depending on the result of the checking. Thus, in a case where a plurality of failures such as a jam in the paper conveying unit, a jam in duplex unit, or the like occur, when a user closes a cover in the operation of solving the failures, information is given to the user such that the user is allowed to recognize which part of the operation has been completed.

FIGS. 9 to 12 are flow charts illustrating processes performed by the CPU 101 illustrated in FIG. 1 to display maintenance procedures.

Figure 9:
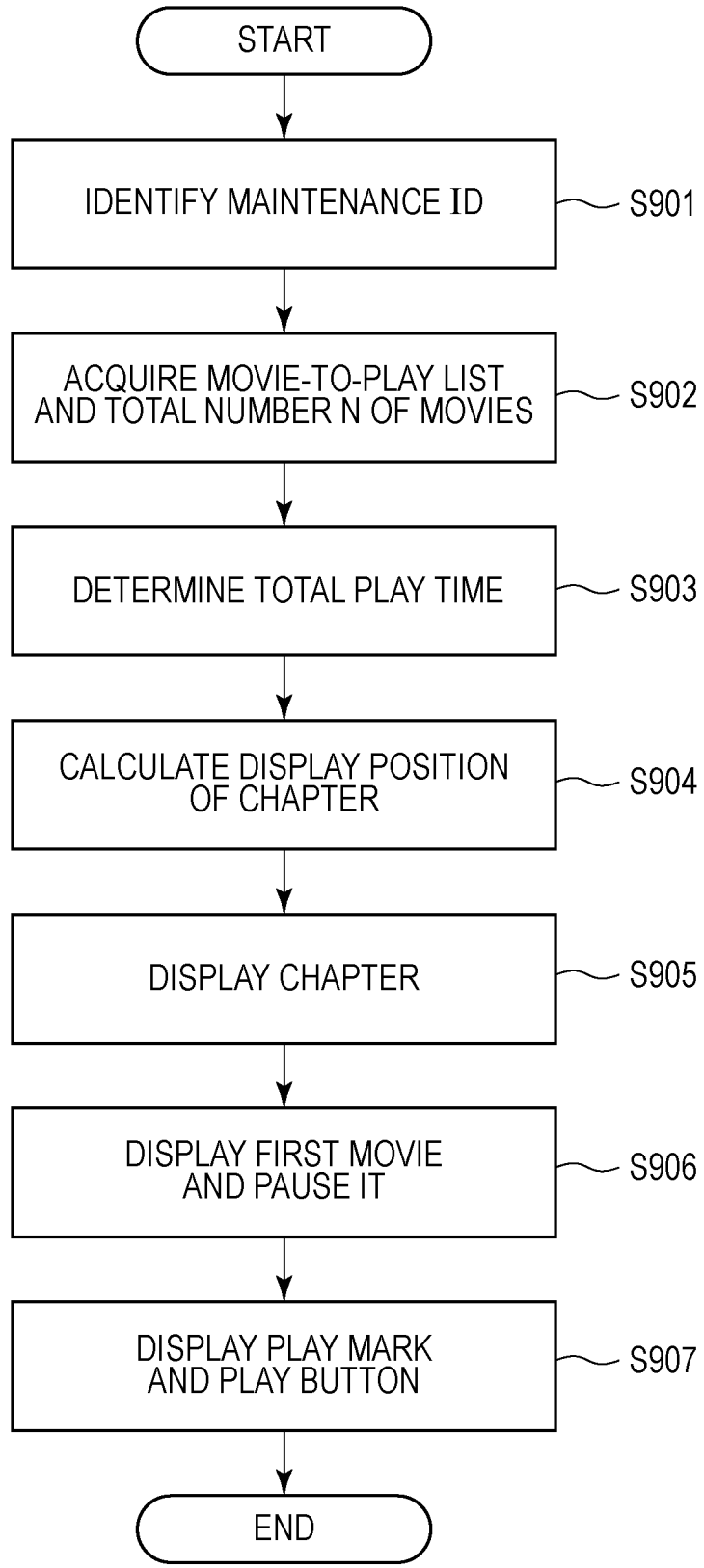
FIG. 9 is a flow chart illustrating a processing procedure according to a first embodiment.

The process illustrated in FIG. 9 is started when the printer control unit 105 detects a change in any one of values output by the following sensors: a sensor that detects an open/closed state of the right-hand cover 201 and that of the toner cover 202, the paper discharge unit sensor 315, and the duplex unit sensor 316.

First, the CPU 101 determines which maintenance event has occurred and identifies the maintenance ID (S901). For example, in a case where the value output by the paper discharge unit sensor 315 indicates that printing paper is jammed in a region close to this sensor, the CPU 101 determines that the maintenance ID is 001 (jam in the paper output unit).

Subsequently, the CPU 101 refers to the movie list table 400 to acquire a list of sub-movies corresponding to the maintenance ID determined in S901 and also acquire the total number N of sub-movies (S902). For example, in the case where the identified maintenance ID is 001, sub-movies to be played are A1, A2, and A4, and the total number of sub-movies is 3. The CPU 101 temporarily stores the identified sub-movies in the RAM 104, for example, in the form of array information, in the order in which the sub-movies are to be played.

In S903, the CPU 101 calculates the total playing time of the movie. More specifically, according to the movie table 410, the CPU 101 acquires the play times 413 of the respective sub-movies acquired in S902, and calculates the total sum of these play times 413. The CPU 101 displays the play time indication label (504 in FIG. 5A) and the like according to the calculated total playing time.

Subsequently, the CPU 101 calculates the positions at which to display the respective chapter marks based on the play times 413 of the respective sub-movies (S904). The CPU 101 then displays the chapter marks at the positions, calculated in S904, on the bar (S905).

In S906, the CPU 101 loads the sub-movie with the first movie ID into the RAM 104 and outputs it to the display device 115 such that the sub-movie is displayed in the pause state. For example, in the case where the maintenance ID is 001, the CPU 101 loads the sub-movie A1, which is a preparation procedure movie, into the RAM 104 and outputs it to the display device 115 such that the sub-movie is displayed in the pause state.

The CPU 101 then outputs the play mark and the play button to the display device 115 (S907). Thus, the screen illustrated in FIG. 5A is displayed.

Although in S903 and S904 described above, the CPU 101 calculates the total playing time and the positions at which to display the respective chapter marks by using the play times 413 described in the movie table 410, the CPU 101 may not use the play times 413. That is, the CPU 101 may load the plurality of sub-movies into the RAM 104 and calculate the play times of the respective sub-movies from the frame rate and the numbers of frames of the respective sub-movies. Furthermore, from these calculated values, the CPU 101 may further calculate the total playing time and the positions at which to display the respective chapter marks.

Note that in the present embodiment, there is no particular restriction on the format or the codec of movies, and various formats or codecs may be employed.

Figure 10:
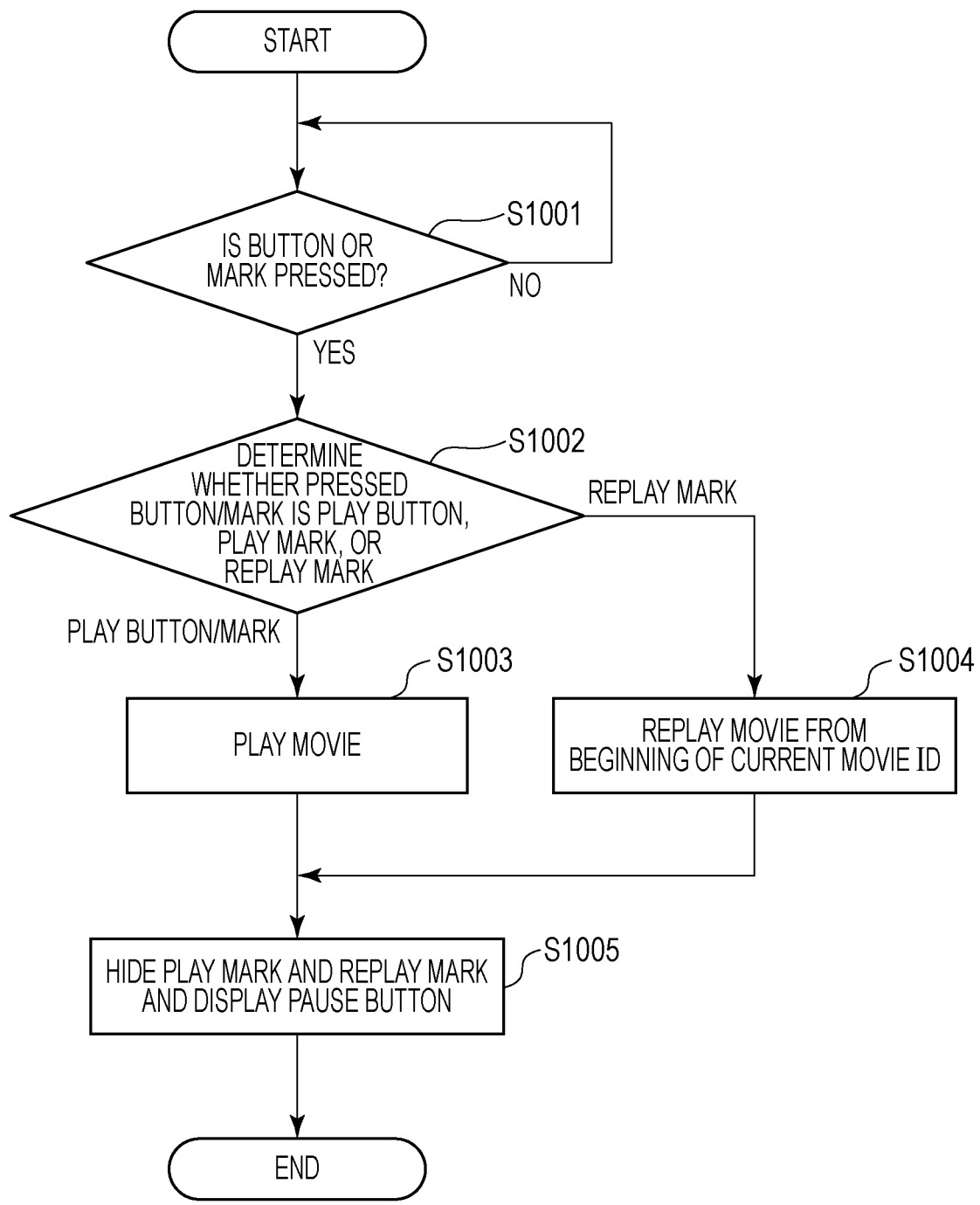
FIG. 10 is a flow chart illustrating a processing procedure according to the first embodiment.

FIG. 10 is a flow chart illustrating a processing procedure performed when the play button, the play mark, or the replay mark is pressed when the movie for presenting the maintenance procedure is in the pause state.

The CPU 101 determines whether a button or a mark is pressed (S1001). Subsequently, the CPU 101 determines whether the button/mark is pressed or the replay mark is pressed (S1002). In a case where it is determined that the play button or the play mark is pressed, the processing flow proceeds to S1003 in which the CPU 101 changes the operation state of the movie into a playing state.

On the other hand, in a case where it is determined that the replay mark is pressed, the processing flow proceeds to S1004, in which the CPU 101 moves the playing position of the sub-movie being currently in the pause state to the beginning of the sub-movie and starts replaying the sub-movie from the beginning.

In S1005, the CPU 101 hides the replay mark and the play mark and displays the pause button on the display device 115. Thus, the screens illustrated in FIG. 5B, FIG. 6A, FIG. 6D, or the like are displayed.

Figure 11:
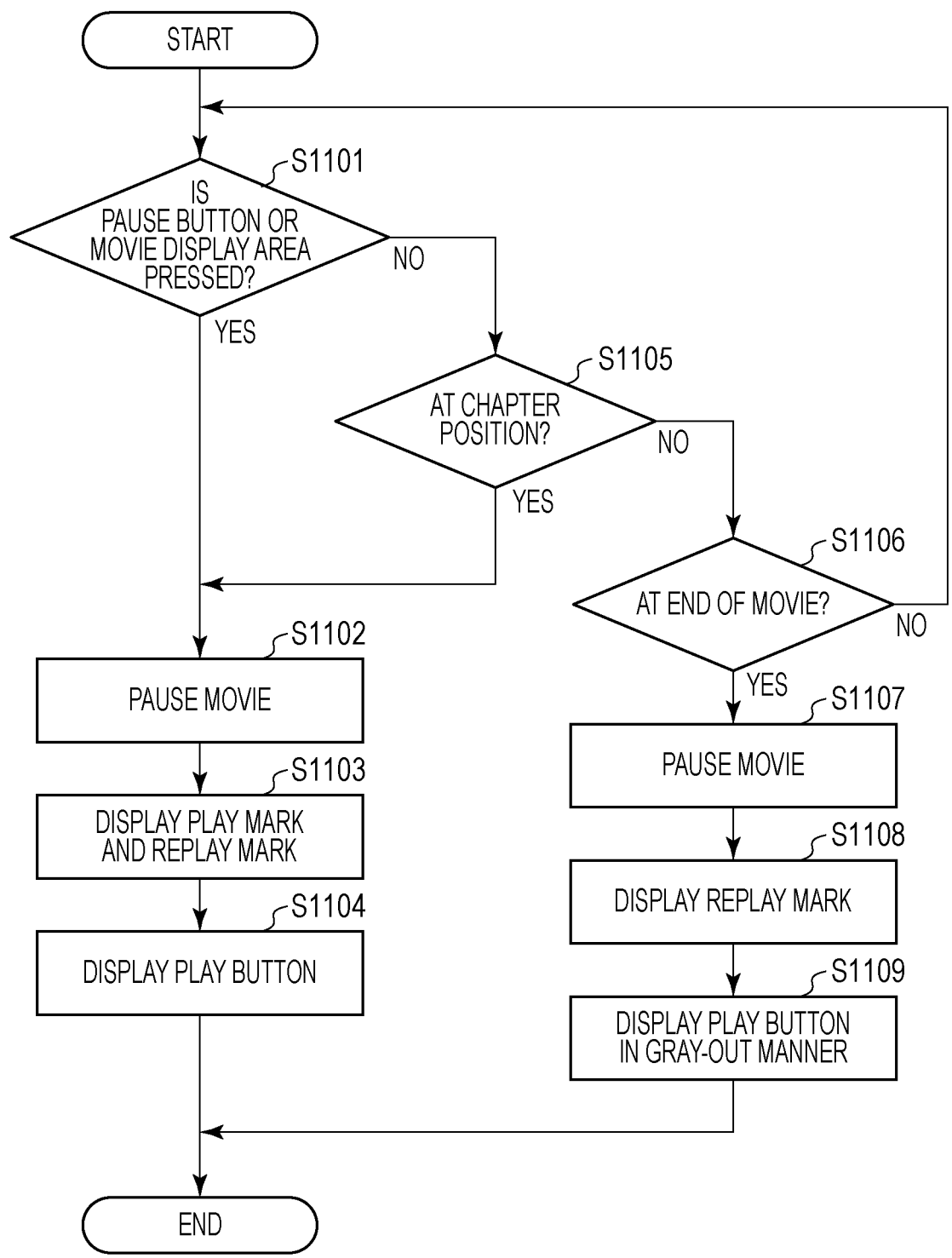
FIG. 11 is a flow chart illustrating a processing procedure according to the first embodiment.

FIG. 11 is a flow chart illustrating a processing procedure performed to stop playing of a movie representing a maintenance procedure.

The CPU 101 determines whether the pause button or the movie displaying area is pressed (S1101). In a case where it is determined that the pause button or the movie displaying area is pressed, the processing flow proceeds to S1102 in which the CPU 101 changes the operation state of the movie into the pause state.

Subsequently, the CPU 101 displays the play mark and the replay mark on the display device 115 (S1103).

Furthermore, the CPU 101 displays the play button on the display device 115 (S1104), and ends the process. Thus, the screen illustrated in FIG. 6B is displayed.

In a case where it is determined in S1101 that the pause button and the movie displaying area are not pressed, the processing flow proceeds to S1105, in which the CPU 101 determines whether the playing position of the movie is at a position corresponding to one of chapter marks. Note that the chapter marks are at boundaries between sub-movies, and the beginning and the end of the total movie are not included in the chapter mark positions. In a case where it is determined that the playing position of the movie is at one of chapter mark positions, the CPU 101 performs the process from S1102 to S1104 described above. Thus, the screens illustrated in FIG. 5C and FIG. 6C are displayed.

On the other hand, in a case where it is determined in S1105 that the playing position of the movie is not at any one of the chapter mark positions, the CPU 101 determines whether the playing position of the movie has reached the end of a sub-movie (S1106). In a caser where it is determined that the end of a sub-movie has been reached, the CPU 101 changes the operation state of the movie into a pause state (S1107). On the other hand, in a case where it is determined that the end of a sub-movie has not been reached, the CPU 101 returns the process to S1101. After S1107, the CPU 101 displays the replay mark on the display device 115 (S1108).

Furthermore, the CPU 101 displays the play button in the grayed-out manner on the display device 115 (S1109). Thus, the screen illustrated in FIG. 7A is displayed. Alternatively, in S1108, the grayed-out play mark may be displayed together with the replay mark (FIG. 7B).

Figure 12:
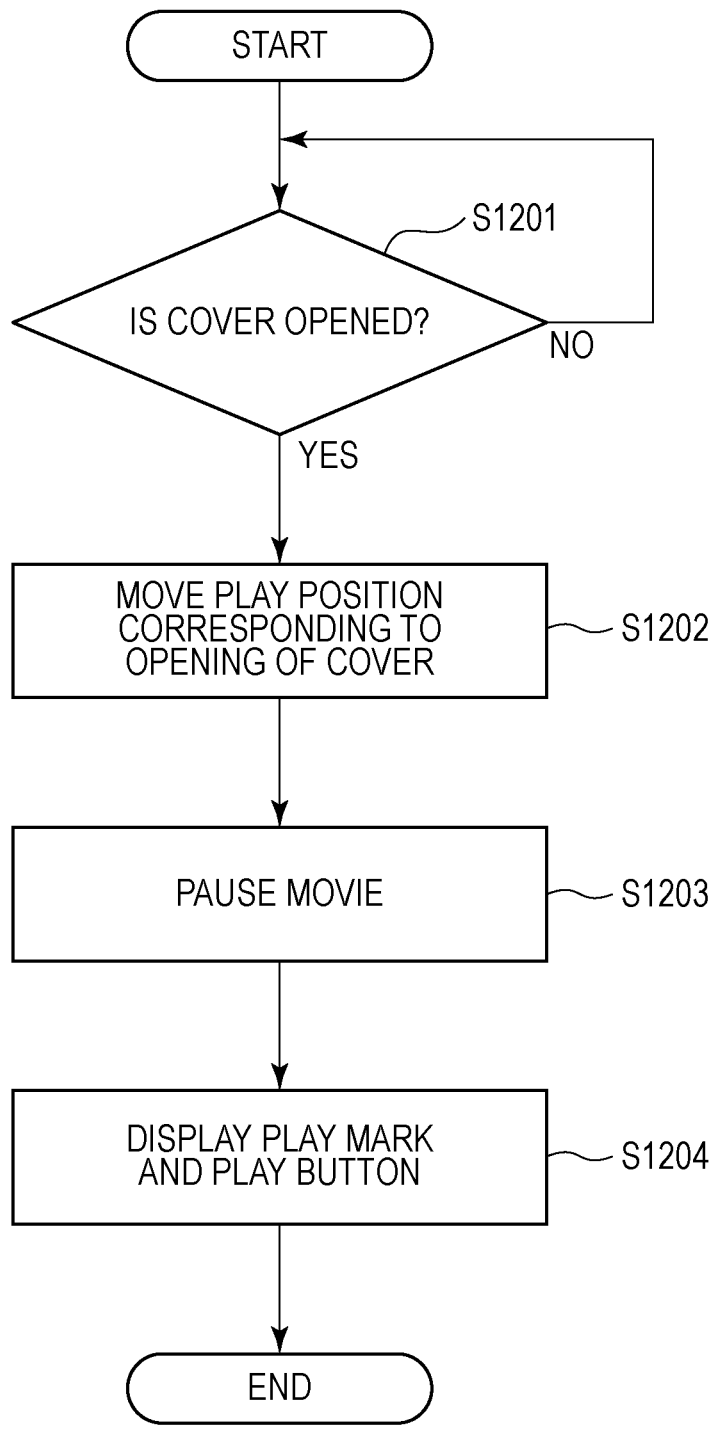
FIG. 12 is a flow chart illustrating a processing procedure according to the first embodiment.

FIG. 12 is flow chart illustrating a process performed when the cover of the image forming apparatus 100 is opened in a state in which a movie representing a maintenance procedure is being displayed.

In S1201, the CPU 101 determines whether a cover is opened that corresponds to a currently occurring maintenance event. For example, in a case where the jam in the paper conveying unit (in this case, the maintenance ID is 001) occurs, the movie includes the sub-movie A1 representing the operation procedure of opening the right-hand cover 201, and thus the CPU 101 checks the value output from the sensor of the right-hand cover 201 to determine whether the right-hand cover 201 is opened. In a caser where it is determined that the corresponding over is opened, the CPU 101 checks the value of the cover open/close flag 414 in the movie table 410 and moves the playing position of the movie to the beginning of a first sub-movie specified by the cover open/close flag 414 and representing an operation procedure to be performed after the cover is opened, that is, to the beginning of the main procedure movie (S1202). For example, in the case where the maintenance ID is 001, the first sub-movie in the main procedure movie, that is, the first sub-movie corresponding to the value of 1 of the cover open/close flag 414 is A2. Therefore, the CPU 101 moves the playing position of the movie to the beginning of the sub-movie A2.

The CPU 101 then changes the operation state of the movie into the pause state (S1203), and displays the play mark and the play button on the display device 115 (S1204). Thus the screen illustrated in FIG. 5D is displayed. Note that in the present process, also in a case where opening of the corresponding cover is detected when the main procedure movie is being played, the process from S1202 to 1204 is performed. For example, in the case where the maintenance ID is 001, if opening of the right-hand cover 201 is detected again in the middle of the operation of playing the sub-movie A2 in the main procedure movie, the CPU 101 changes the displayed screen to that illustrated in FIG. 5D. Thus, also in the case where the playing position is moved to the main procedure movie by operating the seek bar before the cover is opened, it is possible to instruct what procedure is to be performed next, which prevents a user from missing watching the instruction of the operation procedure.

Figure 13:
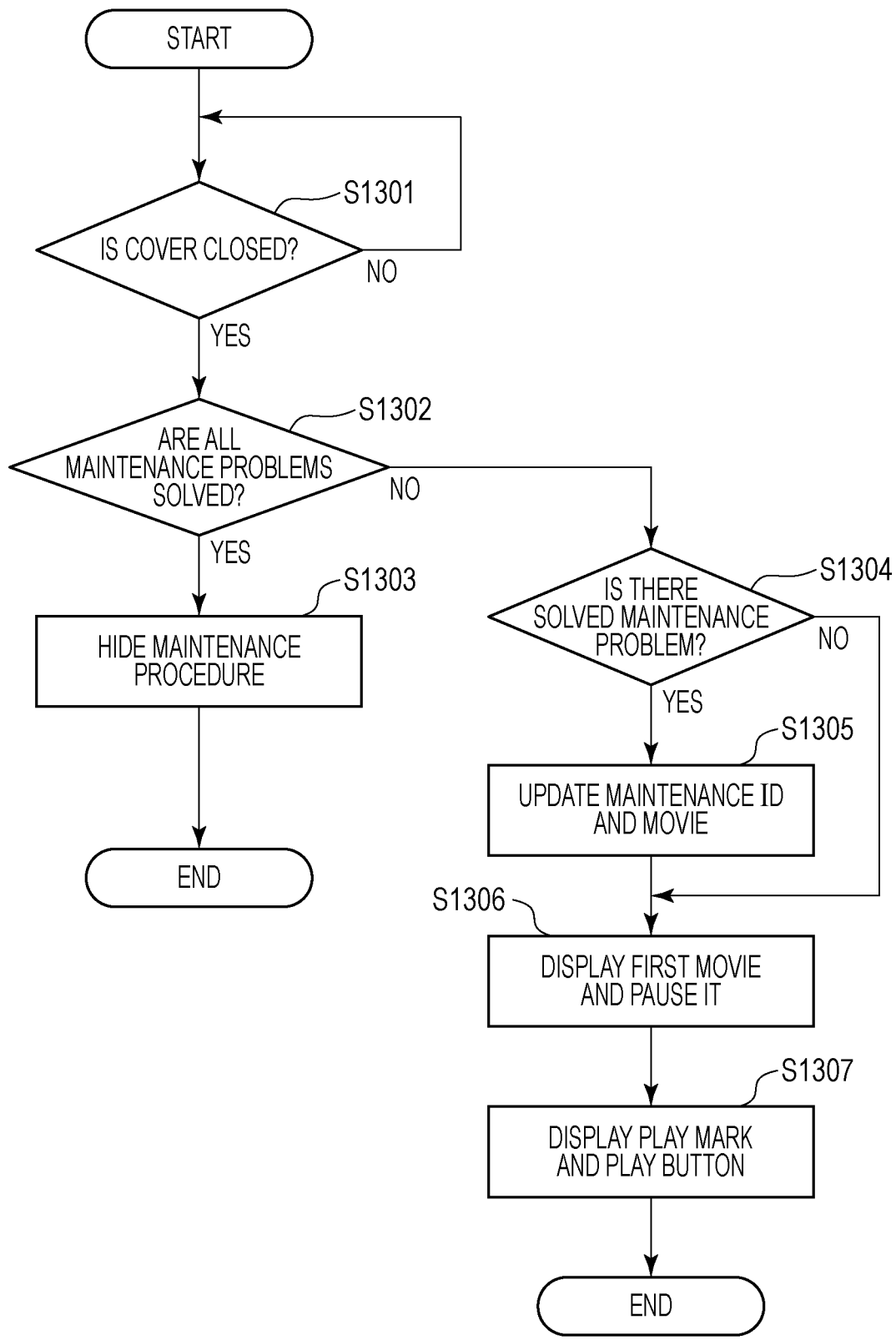
FIG. 13 is a flow chart illustrating a processing procedure according to the first embodiment.

FIG. 13 is a flow chart illustrating a process performed when the cover of the image forming apparatus 100 is closed in a state in which a movie representing a maintenance procedure is being played.

In S1301, the CPU 101 determines whether the cover in the open state is closed. In a case where it is determined that the cover is closed, the CPU 101 determines whether all maintenance events have been solved (S1302). For example, in a case where a jam in the paper conveying unit and a jam in duplex unit occur, if the right-hand cover 201 is closed in the middle of the operation of playing a corresponding movie, the CPU 101 checks the values of the paper discharge unit sensor 315 and the duplex unit sensor 316 to determine whether the jam in the paper conveying unit and the jam in duplex unit have been solved. In a case where it is determined that both jams have been solved, the CPU 101 advances the process to S1303. In a case where it is determined that both jams have not been solved, the CPU 101 advances the process to S1304.

In S1303, the CPU 101 hides the screen for presenting the maintenance procedure and ends the process.

In S1304, the CPU 101 determines whether there is a maintenance event that has been solved. For example, the determination is performed as to whether either the jam in the paper conveying unit or the jam in duplex unit has been solved. In a case where it is determined that there is a maintenance event that has been solved, the CPU 101 changes the maintenance D determined in S901 in FIG. 9 to a maintenance D corresponding to a maintenance event that has not yet been solved (S1305). For example, when jams occur in both the paper conveying unit and the duplex unit (in this case, the maintenance ID is 003), if the jam in the paper conveying unit is solved when the corresponding maintenance procedure is being presented, and subsequently if the right-hand cover 201 is closed, then the CPU 101 changes the maintenance D to 002. Furthermore, the CPU 101 loads a movie corresponding to the changed maintenance ID into the RAM 104. The CPU 101 then calculates the total playing time and places chapter marks. The detailed process is similar to that performed in S901 to S905 described above, and thus a further description of omitted.

Subsequently, the CPU 101 loads the movie corresponding to the changed maintenance ID into the RAM 104 and displays the movie on the display device 115 in the pause mode (S1306). For example, in the case where the maintenance ID is 002, according to the movie list table 400, the CPU 101 displays a screen in which the sub-movie A1 is displayed such that the sub-movie 1 is stopped at the beginning thereof.

The CPU 101 then displays the play mark and the play button on the display device 115 (S1307). Thus, the screen is switched from that illustrated in FIG. 8A to that illustrated in FIG. 8B. In this processing, the movie of the operation procedure that has already been completed is not played again, but the movie associated with the maintenance event that has not yet been solved is played from its beginning, which allows an improvement in maintenance efficiency and which prevents a user from missing watching the instruction of the operation procedure.

Second Embodiment

A second embodiment is described below with a focus on a difference from the first embodiment. In the first embodiment, in the case where the replay mark 701 is pressed (S1004 in FIG. 10) in the state in which the playing position of the movie has reached its end (FIG. 7A or FIG. 7B), the playing of the movie is returned to the beginning of the sub-movie corresponding to the position at which the movie is stopped, and the replaying is started (S1004 in FIG. 10). In the following description, it is assumed by way of example that the playing position is returned to a different position depending on the open/closed state in which the cover is when the replay mark is pressed.

Figure 14:
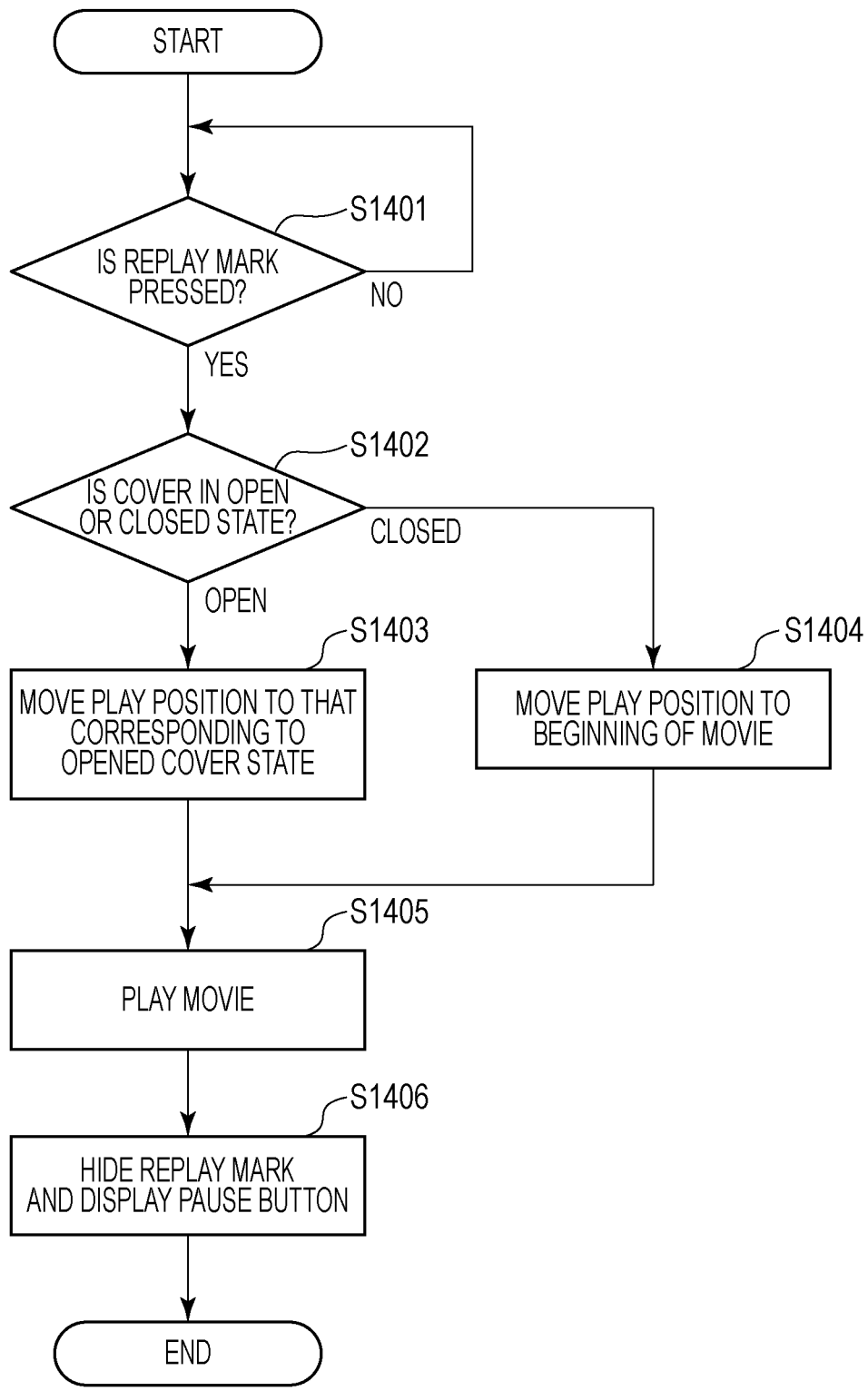
FIG. 14 is a flow chart illustrating a processing procedure according to a second embodiment.

FIG. 14 is a flow chart illustrating a process performed by the CPU 101 when the replay mark is pressed in a state in which the playing of a movie is stopped at the end of the movie.

First, the CPU 101 determines whether the replay mark is pressed (S1401). In a case where it is determined that the replay mark is pressed, the CPU 101 further determines whether a cover corresponding to a maintenance event that is currently occurring is in an opened or closed state (S1402). More specifically, for example, in a case where the maintenance ID is 001, a determination is performed as to whether the right-hand cover 201 is in the opened state or the closed state. In a case where it is determined that the corresponding cover is in the opened state, the CPU 101 advances the process to S1403. On the other hand, in a case where it is determined that the corresponding cover is in the closed state, the CPU 101 advances the process to S1404.

In S1403, according to the cover open/close flag 414 in the movie table 410, the CPU 101 moves the playing position of the movie to the beginning of the main procedure movie.

In S1404, the CPU 101 moves the playing position of the movie to the beginning of a movie with a corresponding maintenance ID.

After the process in S1403 or S1404, the CPU 101 changes the operation of the movie into a playing state (S1405). The CPU 101 then hides the replay mark and displays the pause button on the display device 115 (S1406).

Figure 15A:
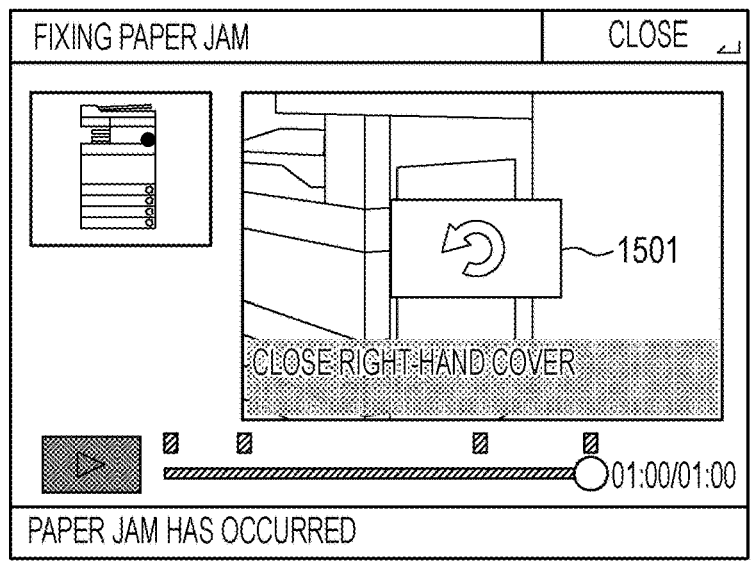
FIGS. 15A to 15C are diagrams illustrating examples of screens of a display device according to the second embodiment.
Figure 15B:
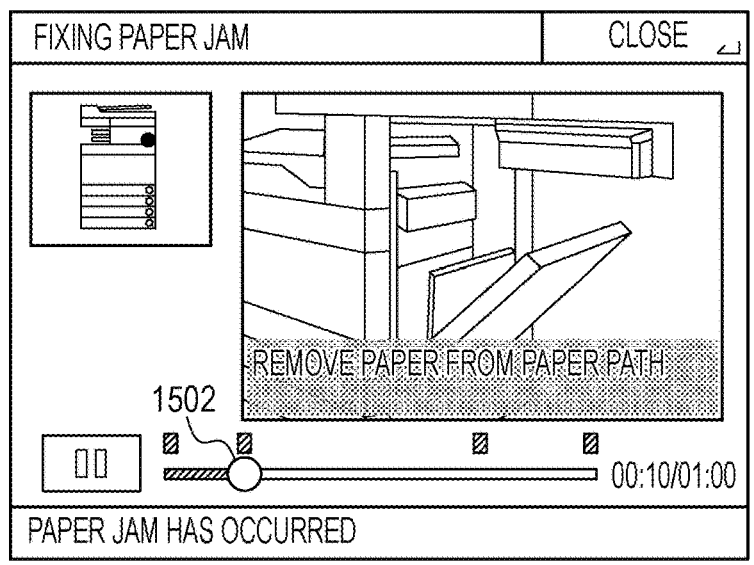
Figure 15C:
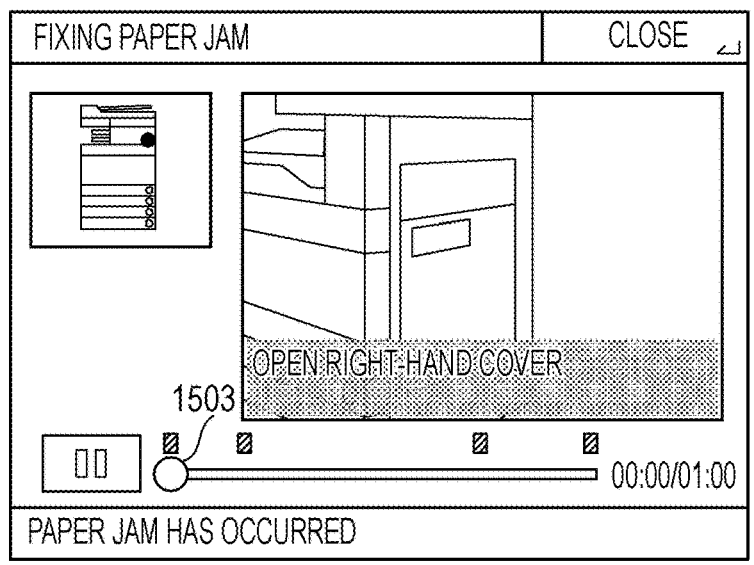

FIGS. 15A to 15C are diagrams illustrating examples of screens displayed when the process illustrated in FIG. 14 is performed.

FIG. 15A illustrates an example of a screen displayed at a point of time when the process from S1106 to S1106 in FIG. 11 is performed. Herein it is assumed that a movie corresponding to a jam in the paper conveying unit (in this case, the maintenance ID is 001) has been played and the movie is stopped at the end thereof.

Herein, if the replay mark 1501 is pressed when the right-hand cover 201 is in the opened state, replaying of the movie is started from the beginning (1502) of the sub-movie A2, which is a first sub-movie in the main procedure movie (FIG. 15B).

On the other hand, in a case where the replay mark 1501 is pressed when the right-hand cover 201 is in the closed state, replaying of the movie is started from the beginning of the sub-movie A1, which is a preparation procedure movie corresponding to a jam in the paper conveying unit (FIG. 15C).

In the present embodiment, as described above, the position from which to start replaying a movie is changed depending on whether the cover is in the opened or closed state, which allows it to start the replaying of the movie from a position corresponding to a correct operation procedure.

Third Embodiment

A third embodiment is described below with a focus on a difference from the first embodiment. In the third embodiment, a discussed is given on a process performed when the movie displaying area 501 is pressed by a user.

Figure 16:
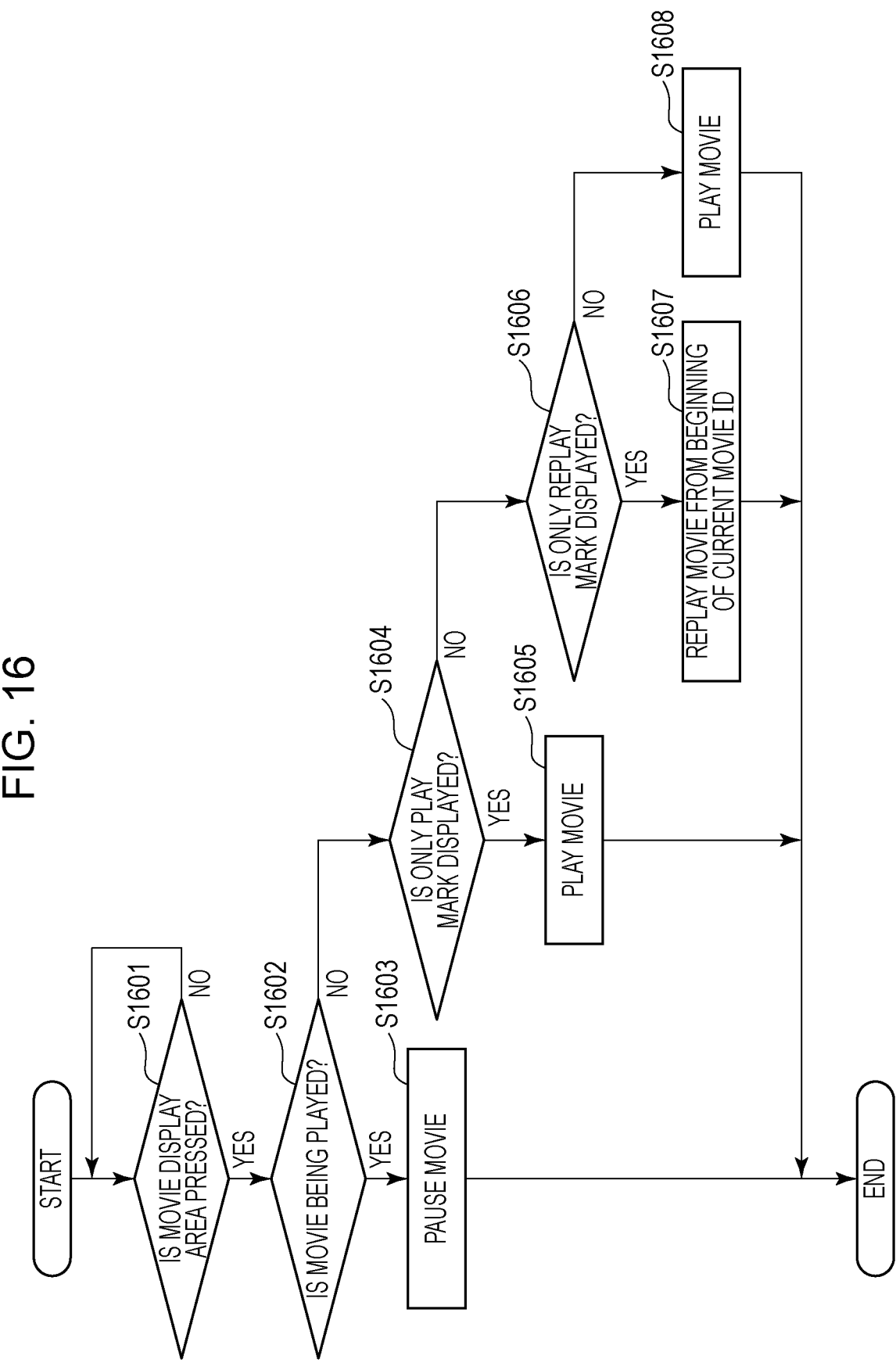
FIG. 16 is a flow chart illustrating a processing procedure according to a third embodiment.

FIG. 16 is a flow chart illustrating the process performed by the CPU 101 when the movie displaying area 501 is pressed by a user.

First, the CPU 101 determines whether the movie displaying area 501 is pressed by a user (S1601). In a case where it is determined that the movie displaying area 501 is pressed, the CPU 101 further determines whether a movie is in a playing operation (S1602). In a case where it is determined that a movie is in a playing operation (for example, as in a case illustrated in FIG. 5B or FIG. 6A), the CPU 101 controls the operation of the movie into a pause state (S1603), and ends the process.

On the other hand, in a case where it is determined in S1602 that there is no movie in a playing operation, the CPU 101 determines whether a play mark is only a mark displayed on the display device 115 (S1604). In a case where it is determined that the play mark is only the mark displayed on the display device 115 (for example, as in a case illustrated in FIG. 5A or 5D), the CPU 101 changes the operation of the movie into a playing state (S1605). On the other hand, in a case where it is determined that the play mark is not only the mark displayed on the display device 115, the CPU 101 advances the processing flow to S1606.

In S1606, the CPU 101 determines whether a replay mark is displayed as only one mark on the display device 115. In a case where it is determined that the replay mark is only the mark displayed on the display device 115 (for example, as in a case illustrated in FIG. 7A), the CPU 101 moves the playing position of the sub-movie being currently in the pause state to the beginning thereof and starts it (S1607).

In a case where it is determined in S1606 that the replay mark is not the only mark displayed on the display device 115, that is, in a case where the replay mark and the play mark are both displayed, the CPU 101 changes the operation state of the movie into a playing state (S1608). This allows a user to control playing, stopping, and replaying of the movie by performing a simple operation, which results in an improvement in operability.

Figure 17:
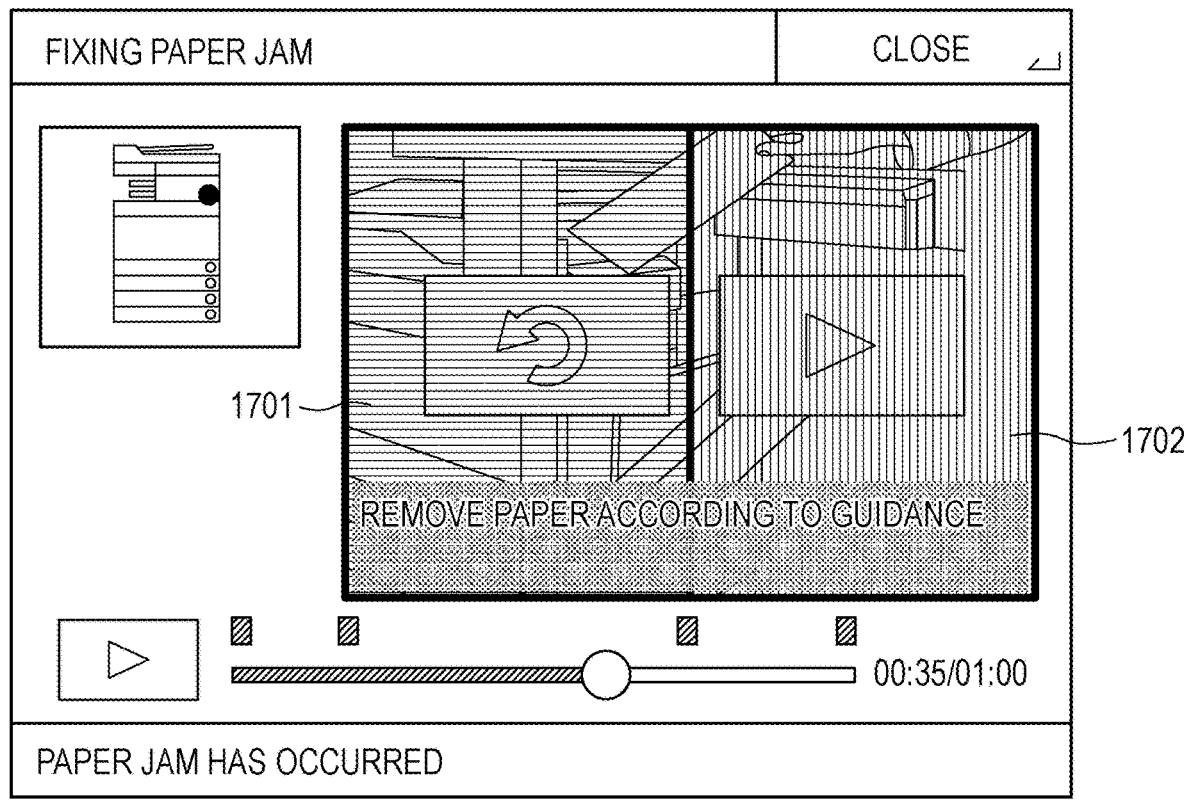
FIG. 17 is a diagram illustrating an example of a screen of a display device according to the third embodiment.

Note that in the process in S1608, in the case where the play mark and the replay mark are both displayed, the process may be changed depending on a pressed position in the movie displaying area. That is, when a point in an area 1701 illustrated in FIG. 17 is pressed, then, as with the case in which the replay mark is pressed, the CPU 101 moves the playing position to the beginning of the sub-movie being stopped and changes the operation state thereof to a playing state. In a case where an area 1702 is pressed, as in the case where the play mark is pressed, the CPU 101 changes the operation state of the movie to a playing state.

Note that in S1607 described above, when the movie displaying area is pressed in the state in which the movie is stopped at the end of thereof, instead of moving the playing position to the beginning of the sub-movie being stopped, the process may be performed in a similar manner to the second embodiment. That is, in the case where the cover is in the opened state, the CPU 101 may move the playing position to the beginning of the sub-movie representing the processing procedure to be performed after the cover is opened and may start replaying the sub-movie. On the other hand, in the case where the cover is in the closed state, the CPU 101 may move the playing position to the beginning of a movie with a corresponding maintenance ID and may start replaying the movie.

In the present embodiment, it is assumed by way of example that the CPU 101 changes the operation performed when the movie displaying area 501 is pressed depending on which mark is displayed in this situation. Alternatively, the operation to be performed may be specified in advance by a user.

In the embodiments described above, the image forming apparatus 100 prepares a plurality of sub-movies respectively representing operation procedures to be performed to solve maintenance events. When a maintenance event occurs, the image forming apparatus 100 combines proper sub-movies as necessary depending on the maintenance event and plays them as one movie. By preparing independent sub-movies respectively representing operation procedures, such as an operation procedure of opening the cover, which are common among a plurality of maintenance events, it becomes possible to make efficient use of the storage compared with the case in which one movie is prepared for each maintenance event.

Because a plurality of sub-movies are combined into one movie, a user is allowed to easily recognize the total time necessary to perform the operation to solve a maintenance event and easily recognize a progress status of the operation. In the case where a movie is stopped, a replay mark is displayed for use to issue a command to replay the movie from the beginning of a sub-movie corresponding to the position where the movie is stopped, and thus a user is allowed to watch repeatedly the movie indicating the content of the operation procedure to be performed now, which prevents the user from missing watching the instruction of the operation procedure.

Other Embodiments

In the embodiments described above, it is assumed by way of example that the image forming apparatus 100 has a plurality of functions such as a copying function, a copying function, and the like. There is no particular restriction on the functions of the image forming apparatus 100, and the image processing apparatus may have part of the functions described above. The embodiments may be applied to other types of information processing apparatuses such as a personal computer, a PDA device, a portable telephone device, a facsimile device, a camera, a video camera, an image viewer, or the like.

As described above, the embodiments make it possible to solve situations that may occur when a movie is played to present an operation procedure of performing maintenance on the image forming apparatus.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. An image processing apparatus comprising:
at least one processor and at least one memory coupled to the at least one processor, the at least one memory having stored thereon instructions, which, when executed by the at least one processor, cause the at least one processor cooperating to act as:
a detecting unit configured to detect a maintenance event that has occurred on the image processing apparatus;
a storing unit configured to store a plurality of movie files in association with each message information, where the plurality of movie files corresponds to a plurality of processes for maintenance event resolution, and store identification information for identifying one maintenance event in association with a combination of a plurality of movie files;
an acquiring unit configured to acquire, from among the plurality of movie files stored by the storing unit, a plurality of movie files corresponding to the maintenance event detected by the detecting unit; and
a displaying control unit configured to, based on detecting the maintenance event by the detecting unit, display the plurality of movie files acquired by the acquiring unit as a sequence movie,
wherein the displaying control unit displays, together with the movie file, the corresponding message information stored in association with the displayed movie file by the storing unit.

2. The image processing apparatus according to claim 1, wherein the displaying control unit displays the movie files together with a play bar that represents a total length of the movie files.

3. The image processing apparatus according to claim 2, wherein the displaying control unit displays the total play time of the movie files.

4. The image processing apparatus according to claim 1, wherein the maintenance event is running out of toner.

5. The image processing apparatus according to claim 1, wherein the maintenance event is a paper jam.

6. The image processing apparatus according to claim 1, wherein the message information is a message that indicates an operation corresponding to the movie file.

7. The image processing apparatus according to claim 1, wherein the displaying control unit displays the sequence movie which shows a user how to resolve the maintenance event detected by the detecting unit, and plays one of the plurality of movie files according to receipt of a designated user instruction.

8. The image processing apparatus according to claim 1, wherein the displaying control unit displays the message corresponding to the movie file being displayed, and
wherein, upon completion of playing of a first movie file, the displaying control unit does not play a second movie file that is a next movie file but plays the first movie file from the beginning according to receipt of the designated user instruction.

9. The image processing apparatus according to claim 1, wherein in accordance with the maintenance event detected by the detecting unit, the acquiring unit changes a combination of the movie files acquired.

10. The image processing apparatus according to claim 1, wherein in a case where a predetermined cover is closed, the display contents are changed according to whether or not the detected maintenance event is resolved.

11. The image processing apparatus according to claim 1, wherein a replay mark for instructing playback from the beginning of the temporarily presented movie file is displayed when one movie file out of the plurality of movie files is paused.

12. The image processing apparatus according to claim 1, wherein at least one of the plurality of movie files acquired when a first maintenance event is detected is used as one of the plurality of movie files acquired when a second maintenance event different from the first maintenance event is detected.

13. The image processing apparatus according to claim 1, wherein the storing unit stores a playback order of the plurality of movie files.

14. A method for controlling an image processing apparatus, the method comprising:
- detecting a maintenance event that has occurred on the image processing apparatus;
- storing a plurality of movie files in association with each message information, where the plurality of movie files corresponds to a plurality of processes for maintenance event resolution, and storing identification information for identifying one maintenance event in association with a combination of a plurality of movie files;
- acquiring, from among the stored plurality of movie files, a plurality of movie files corresponding to the detected maintenance event; and
- based on detecting the maintenance event, displaying the acquired plurality of movie files as a sequence movie,
- wherein, together with the movie file, the corresponding message information stored in association with the displayed movie file is displayed.

\* \* \* \* \*